United States Patent
Tal et al.

(10) Patent No.: US 8,724,649 B2
(45) Date of Patent: May 13, 2014

(54) DISTRIBUTED COEXISTENCE SYSTEM FOR INTERFERENCE MITIGATION IN A SINGLE CHIP RADIO OR MULTI-RADIO COMMUNICATION DEVICE

(75) Inventors: Nir Tal, Haifa (IL); Yaniv Tzoreff, Tel Aviv (IL); Moran Amidan, Yehud (IL); Gregory Lerner, Petach Tikva (IL); Ronen Isaac, Tel Aviv (IL); Roi Faust, Ra'anana (IL)

(73) Assignee: Texas Instruments Incorporated, Dallas, TX (US)

( * ) Notice: Subject to any disclaimer, the term of this patent is extended or adjusted under 35 U.S.C. 154(b) by 1048 days.

(21) Appl. No.: 12/325,401

(22) Filed: Dec. 1, 2008

(65) Prior Publication Data

US 2010/0137025 A1     Jun. 3, 2010

(51) Int. Cl.
*H04L 12/413*     (2006.01)
*H04B 3/32*     (2006.01)

(52) U.S. Cl.
CPC .............. *H04L 12/413* (2013.01); *H04B 3/32* (2013.01)
USPC ....................... 370/445; 455/296; 455/553.1

(58) Field of Classification Search
CPC ....... H04B 3/32; H04L 12/413; H04L 12/417
USPC ......... 370/201, 350, 432, 437, 480, 328–329, 370/331–333, 342–344, 400–401, 445, 447, 370/449–450; 713/500–501; 455/63.1, 455/114.2, 296, 422.1, 436–440, 442
See application file for complete search history.

(56) References Cited

U.S. PATENT DOCUMENTS

| | | | | |
|---|---|---|---|---|
| 7,065,376 B2* | 6/2006 | Wolman et al. | ................ | 455/517 |
| 7,804,760 B2* | 9/2010 | Schmukler et al. | ........... | 370/201 |
| 7,809,012 B2* | 10/2010 | Ruuska et al. | ................ | 370/449 |
| 8,023,438 B2* | 9/2011 | Kangasmaa et al. | .......... | 370/286 |
| 8,160,032 B2* | 4/2012 | Yang et al. | .................... | 370/336 |
| 2006/0188003 A1* | 8/2006 | Larsson | ........................ | 375/130 |
| 2006/0290434 A1* | 12/2006 | Bettner et al. | .................. | 331/16 |
| 2008/0247445 A1* | 10/2008 | Guo et al. | ..................... | 375/220 |
| 2009/0003303 A1* | 1/2009 | Zhu et al. | ...................... | 370/345 |
| 2009/0080498 A1* | 3/2009 | Deisher et al. | ................ | 375/136 |
| 2009/0103572 A1* | 4/2009 | Zerbe | ............................ | 370/503 |
| 2009/0138745 A1* | 5/2009 | Dorsey et al. | ................. | 713/501 |
| 2011/0069604 A1* | 3/2011 | Schmukler et al. | ........... | 370/201 |

* cited by examiner

*Primary Examiner* — Kevin Mew
(74) *Attorney, Agent, or Firm* — Ronald O. Neerings; Wade James Brady; Frederick J. Telecky, Jr.

(57) ABSTRACT

A novel and useful apparatus for and method of distributed coexistence for mitigating interference in a single chip radio and/or a multi-radio (i.e. multi-transceiver) communications device. The invention enables coexistence 'friendly' radio IPs having frequency agility in that they are capable of shifting their clock frequencies thereby avoiding frequency bands of potential victim radios. Frequency agility on the aggressor radio side (rather than by mitigating the effect of interference on the victim radio side) prevents harmonics from the aggressor's clock scheme from falling in the operating frequency band of the victim radio, and in turn causing degradation to its performance. Each aggressor radio, based on information received from other radios, configures the root clock frequency of its RX and/or TX chain clock generation circuits.

27 Claims, 19 Drawing Sheets

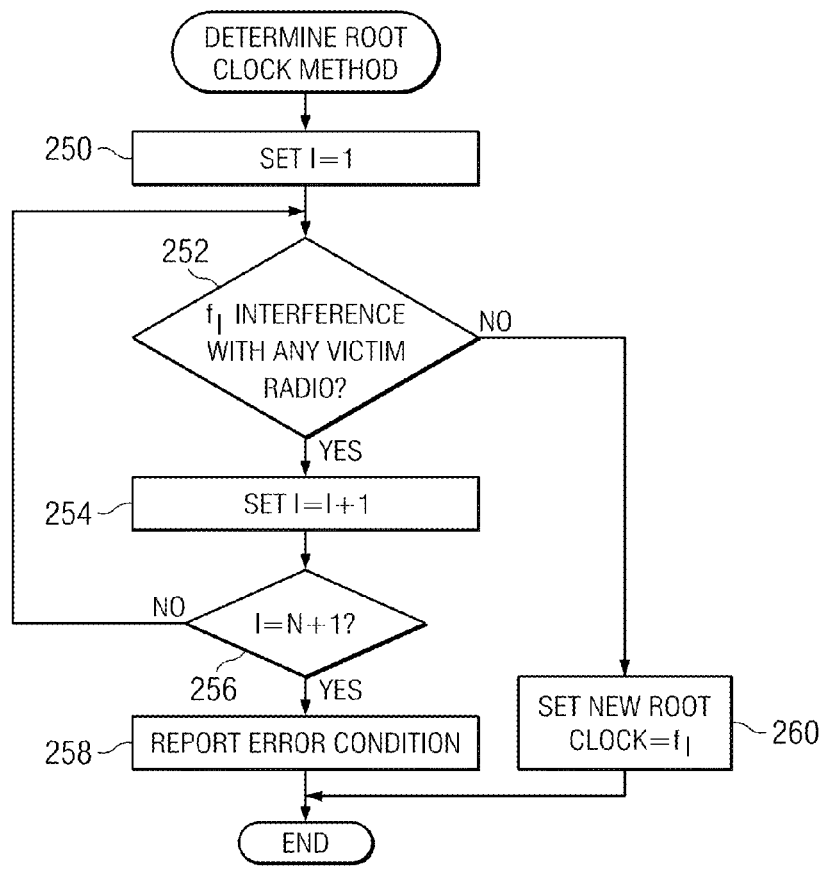
FIG. 12
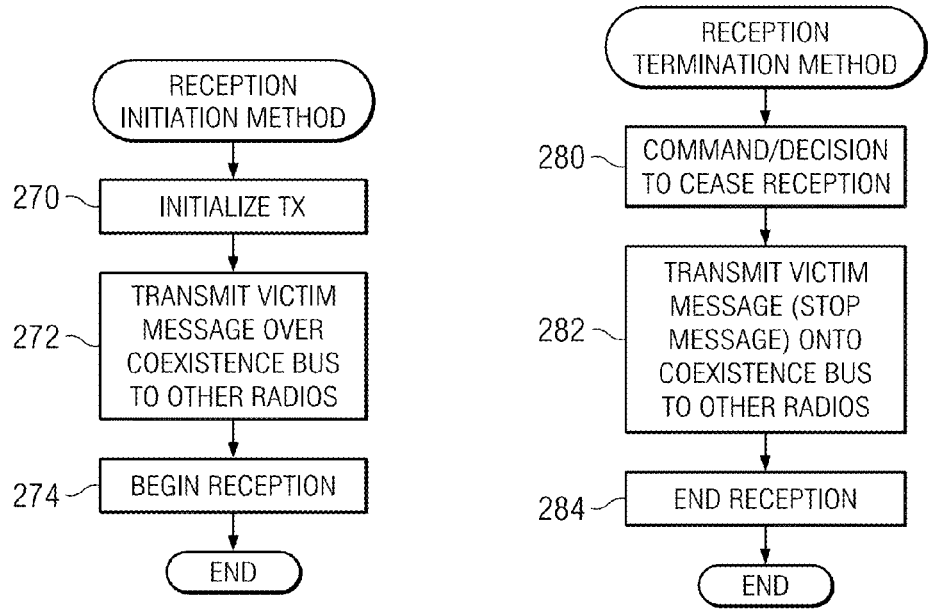
FIG. 13
FIG. 14

+

=

+

=

US 8,724,649 B2

DISTRIBUTED COEXISTENCE SYSTEM FOR INTERFERENCE MITIGATION IN A SINGLE CHIP RADIO OR MULTI-RADIO COMMUNICATION DEVICE

FIELD OF THE INVENTION

The present invention relates to the field of data communications and more particularly relates to coexistence for interference mitigation in a single chip radio and/or a multi-radio (i.e. multi-transceiver) communications device.

BACKGROUND OF THE INVENTION

Currently, many communication devices manufacturers are incorporating multiple radios into their products. As this trend continues, more and more radios will be integrated into the same communications device and/or onto the same integrated chip or system on a chip (SoC). In order for radios to be integrated onto the same chip, SoC or into the same device, it is critical that they coexist with each other. This is an important issue in the design of multi-radio systems that is only gaining in criticality of operation as the number, complexity and frequency band use of radios increases with time.

As an example, consider the block diagram illustrating an example prior art multi-radio communication system as shown in FIG. 1. This example multi-radio communications system, generally referenced 10, comprises a plurality of radios 12, including various cellular and connectivity specific radios such as Global System for Mobile communications (GSM), Global Positioning System (GPS) (receive only), Frequency Modulation (FM) (receive and possibly transmit), Bluetooth or other Near Field Communications (NFC) and Wireless Local Area Network (WLAN).

Having multiple radios in a single device provides benefits and advantages to users by enabling the operation of several radios simultaneously. For example, a user may be listening to an FM radio station over a Bluetooth headset while using the GPS radio to navigate to a destination and carrying on a conversation over a cellular radio link.

Another aspect of coexistence is the long term trend of implementing as much of the radio in digital as is practical and to integrate as much of the radio as possible into a single chip. With the explosive growth of the cellular phone industry, the need has arisen to reduce cost and power consumption of mobile handsets. To keep costs down, the entire radio, including memory, application processor, digital baseband processor, analog baseband and RF circuits, would ideally be all integrated onto a single silicon die with a minimal count of external components. The use of low-voltage deep submicron CMOS processes allows for an unprecedented degree of scaling and integration in digital circuitry, but complicates implementation of traditional RF circuits. Furthermore, any mask adders for RF/analog circuits are not acceptable from a fabrication cost standpoint.

A consequence of this is the presence of multiple high rate clocks that are needed to drive the massive digital logic circuits. The clocks from one radio can interfere not only with the operation of other radios but with the operation of that radio itself. In particular, in single chip wireless systems (i.e. systems with RF transceivers and digital logic), digital clocks can potentially leak into the RF antenna port or other parts of the system and desensitize the receivers. Due to the very low input power required for good packet (or signal) reception and the relatively high currents drawn by the digital portions of the system, it is usually impossible to provide sufficient on-chip isolation between the digital circuitry and the RF circuit portion. Consider the prior art receiver and transmitter circuit examples presented infra.

A traditional receiver/transmitter (i.e. transceiver) chain clock scheme uses a single root frequency to derive the needed clock signals. All digital blocks use this frequency or an integer division of it as the clock signal which feeds the digital logic. This frequency is typically an integer multiplication of the system symbol rate.

A first example prior art digital receiver (RX) chain clock scheme utilizing a single frequency PLL is shown in FIG. 2. The prior art receiver, generally referenced 20, comprises data path blocks and clock generation blocks. In particular, the data path blocks comprise an analog to digital converter (ADC) 22, decimation filter 24 and digital RX chain (DRX) 26, which comprise the demodulation blocks. The clock generation circuit block comprises single frequency phase locked loop (PLL) circuit 28 (usually locked onto a crystal oscillator) and one or more clock frequency dividers 30.

In operation, the analog signal 31 (RX DATA IN) received from the RF receiver front end module (FEM) is typically an intermediate frequency (IF) or a zero IF (ZIF) signal. This IF signal is input to the ADC 22 and converted to digital samples using a high rate clock 32. This high rate clock is generated in a Phase Locked Loop circuit 28, using a reference clock signal $F_{REF}$. The output of the ADC is a digital signal 33 sampled at high rate which is then typically down sampled in decimation filter block 24 to generate decimated signal 35. The decimation filter block typically comprises a low pass anti aliasing filter. The down sampled signal 35 is enabled due to the narrowband characteristics of the received signal. The decimated signal 35 is then input to the digital RX block 26, which perform the demodulation functions responsible for extracting the information bits out of the received signal. Note that the entire digital chain is fed with low rate clock signals 34 which are generated by dividing the high rate clock 32 generated by the PLL 28. The high rate clock is divided using the clock divider circuit block 30.

A second example prior art digital receiver (RX) chain clock scheme utilizing a single frequency PLL is shown in FIG. 3. The prior art receiver, generally referenced 40, comprises data path blocks and clock generation blocks. In particular, the data path blocks comprise an analog to digital converter (ADC) 42, PHY block 44 and MAC block 46. The PHY circuit comprises a decimation filter and digital RX chain (DRX) for performing the demodulation function (not shown). The clock generation circuit block comprises single frequency phase locked loop (PLL) circuit 48 and clock frequency dividers 50, 52, 54.

In operation, the analog signal 62 (RX DATA IN) received from the RF receiver front end module (FEM) is typically an intermediate frequency (IF) or a zero IF (ZIF) signal. This IF signal is input to the ADC 42 and converted to digital samples using an 80 MHz divided clock 56. All the divided clocks are generated by dividing a high rate 480 MHz clock generated by the Phase Locked Loop circuit 48 using a reference clock signal $F_{REF}$. The PHY circuit and MAC blocks are also fed the 80 MHz divided clock which is generated by the divided by six clock divider circuit 50. A divide by two clock divider functions to divide the 80 MHz clock to generate a 40 MHz clock 58 which is fed to the PHY and MAC blocks. A divide by four clock divider functions to divide the 480 MHz PLL output clock to generate a 120 MHz clock 60 which is fed to the MAC block.

The output of the ADC 42 is a digital signal 64 sampled at high rate which is input to the PHY circuit. The PHY circuit generates the RX data (i.e. bits), which is input to the MAC block 46 for subsequent processing. The PHY circuit performs the typical baseband processing functions such as down sampling using a decimation filter block to generate a decimated signal and demodulation for extracting the information bits out of the received signal. Note that the entire digital chain is fed with low rate clock signals 34 which are generated by dividing the high rate clock 68 generated by the PLL 48 using clock divider circuits 50, 52, 54.

Single frequency PLLs can be used not only in RX chains but in TX circuits as well. An example prior art digital transmitter (DTX) chain clock scheme circuit utilizing a single frequency PLL is shown in FIG. 4. The typical digital TX chain, generally referenced 130, comprise data path blocks and clock generation blocks. The data path comprises digital TX circuit 132 which comprises modulation blocks (not shown), an interpolation filter 134 and a digital to analog converter (DAC) 136. The clock generation circuit comprises a single frequency PLL 138 and frequency dividers 140.

In operation, the information bits 143 output of the MAC are input to the digital TX block 132, where they are processed and converted to a complex baseband or IF signal 145. This output signal is then interpolated in the interpolation filter 134 to a high rate signal 146 (i.e. sample stream) and inserted to the DAC 136 to generate the TX DATA OUT signal. This signal is then fed to the analog transmitter. The high rate clock 142 used by the DAC and interpolation filter is generated by a Phase Locked Loop circuit 138 using a reference clock signal $F_{REF}$. The output of the PLL is used to feed the DAC and the interpolation filter. The low rate clock 144 is an integer division of the high rate clock 142 generated by the clock divider circuit block 140. The low rate clock feeds the digital TX circuit 132 and the interpolation filer 134.

A major problem, however, associated with prior art clock generation schemes such as that of FIGS. 2, 3 and 4 is their inflexibility regarding their clock generation circuits. In these prior art circuits, the entire digital chain (TX or RX) is fed with a single frequency and its integer divisions. This creates frequency spurs in fixed locations in the frequency band, i.e. the generation of harmonics from the clocks used in the digital chain circuits.

In the case of a multi-transceiver system, where several radios transmit and/or receive simultaneously in different or similar frequency bands, each radio can be either an aggressor, i.e. a radio that is interfering with other radios in the same system, or a victim, i.e. a radio that suffers degradation due to the operation of other radios. In such systems it is of great importance that various radios are able to coexist with one another. The problems and issues raised related to implementing coexistence among the radios eventually affects system functionality by degrading it.

In particular digital clocks, their divisions or harmonics, driving large digital circuits, within one receiver or transmitter can interfere with other receivers. The amount of isolation required in order to prevent de-sensitization in such a case can be impractical. For example, in a system with an FM receiver and a Bluetooth receiver transmitter, the FM receiver can have a sensitivity of a several micro-volts at receiver input (e.g., ~–110 dBV). The signal to noise ratio require to process the FM signal can be about 20 dB. In the same system a concurrently operating Bluetooth receiver or transmitter can have a clock driving its logic at the FM reception frequency (~100 MHz). The voltage of such digital clocks is usually about 1 volt (or 0 dBV). The isolation required in order not to impact the sensitivity of the FM receiver will therefore be 0 dBV–(–110 dBV)+20 dB+margin=130 dB+margin. If it is desired to obtain a small de-sense of about 0.5 dB, the margin should be 10 dB, yielding an intractable isolation of 140 dB. In addition, designing a system with such isolation between two points is a daunting task but many coupling paths between the aggressor and victim can exist making the task almost impossible.

A prior art graph illustrating FM sensitivity versus frequency channel with Bluetooth in active mode is shown in FIG. 5. The graph was generated by an example system comprising a Bluetooth radio and FM receiver. The graph illustrates the sensitivity of an FM receiver in the presence of a co-located Bluetooth receiver or transmitter. The X-axis represents the FM center frequency in MHz and the Y-axis represents the FM receiver sensitivity level in dBm. Desensitized frequency bands can be seen. The spikes marked as 12, 14, 16 highlight the degradation in the FM sensitivity (8-14 dB degradation) due to harmonics generated by the digital clocks in the Bluetooth receiver/transmitter circuitry. For example, spikes 12, 14 are caused by the $9^{th}$ and $10^{th}$ harmonic, respectively, of internal digital clocks. Turning off parts of the Bluetooth radio (i.e. IP) reveals exactly which clock caused the desensitization effect at a given frequency. Note that the degradation caused by the Bluetooth harmonics would typically be sufficient to prevent a user from successfully receiving a desired distant weak FM station. Please note that a de-sensitization of 10 dB represents a link budget loss reducing the effective system range (in open space) by a factor of 3.

A prior art approach to handling the coexistence issues described supra is to attempt to mitigate the impact of the aggressor radio on the victim radio on the victim side using well-known frequency spur cancellation techniques. A major disadvantage of this approach is that it typically only attenuates the spur and does not remove it completely. In addition, such techniques require additional development time that increases system cost, require significant chip area also increasing cost and result in additional power consumption.

Another prior art approach to handling coexistence issues is to design the physical layout in such a way that the impact of the aggressor on the victim will be attenuated. In other words, the aggressor and victim radios are physically and electrically separated as much as possible. The radios can be electrically separated by adding decoupling capacitors to attenuate the leakage caused by the frequency spurs. It is noted, however, that this technique is not always feasible as it requires a very careful physical layout, has a chip area penalty associated with it and any beneficial results can only be known after silicon is available.

It is thus desirable to have a coexistence mechanism that overcomes the disadvantage of the prior art techniques described supra. The coexistence mechanism should preferably be implementable as a simple, all digital implementation and be capable of enabling the simultaneous operation of multiple radios whether located on the same chip or within the same communications device. More specifically, the coexistence mechanism should provide substantially de-sense relaxation without any requirements on the analog component side.

SUMMARY OF THE INVENTION

The present invention is a novel and useful apparatus for and method of distributed coexistence for mitigating interference in a single chip radio and/or a multi-radio (i.e. multi-transceiver) communications device. The coexistence mechanism of the present invention enables coexistence 'friendly' radio IPs that are capable of shifting their clock frequencies thereby avoiding frequency bands of potential victim radios. A coexistence mechanism attempts to solve the coexistence problem through frequency agility on the aggressor radio side (rather than by mitigating the effect of interference on the victim radio side) in order to avoid any harmonics from the aggressor's clock scheme falling in the operating frequency band of the victim radio, and in turn causing degradation to its performance.

In particular, the coexistence mechanism provides significant de-sense relaxation through interference avoidance without any extra requirements on the analog side (e.g., decoupling capacitors, isolation circuitry, etc.).

Depending on the specific implementation, the coexistence mechanism can operate with existing radios without requiring any significant changes to the existing radio. In one embodiment, the coexistence mechanism requires the addition of a clock generation circuit PLL and gating circuitry to the existing radio (i.e. IP).

In operation, the coexistence mechanism is a distributed coexistence scheme that operates within a plurality of aggressor and victim radios. Each radio incorporates a coexistence control unit that functions to communicate receiver information from each victim radio to all other radios. Each aggressor radio that receives the information functions to configure its root clock frequency based on the received RX information in such a way as to avoid interfering with the victim radios.

Thus, the invention uses frequency agility in the aggressor radio to avoid potential victim frequency bands. Each of the potential aggressor radios calculates its own operating frequency so as to avoid interfering with the potential victim radios currently operating. The result of this calculation is a configuration of the RX and/or TX chains clock generation circuits.

The frequency agility itself is implemented in the RX/TX chains using a PLL capable of generating a range of frequencies, dividers to divide the PLL frequency to lower rate clocks and a Real Time Clock (RTC) block which functions to generate a fixed rate clock out of a variety of clock rates, according to its configuration.

The coexistence mechanism described herein is suitable for use in applications that employ single chip radios and/or multi-radio communication devices where RF and clock signal interference between radios and within each radio itself is an occurring problem. An example application is provided of a mobile device, e.g., cellular phone, PDA, etc., that incorporates the coexistence mechanism of the present invention in the co-located multiple radios.

Several advantages of the coexistence mechanism of the present invention include (1) the enablement of coexistence 'friendly' radios that are capable of shifting their own clocks so as to avoid interference with potential victim radio frequency bands; (2) the mechanism does not require extra analog components or other requirements; (3) the mechanism can be implemented entirely digitally (i.e. no analog constraints), and its performance is entirely predictable and can be simulated; and (4) depending on the particular implementation, the mechanism minimizes the additional required chip area and exhibits relatively low power consumption.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the invention, a method of distributed coexistence between a plurality of aggressor and victim radios, the method comprising the steps of each victim radio communicating receiver (RX) information to all other radios and each aggressor radio configuring its root clock frequency based on received RX information so as to avoid interfering with the victim radios.

There is also provided in accordance with the invention, a method of distributed coexistence between a plurality of aggressor and victim radios, the method comprising the steps of receiving receiver (RX) information at an aggressor radio from one or more victim radios, comparing a root clock frequency of the aggressor radio to RX information received from the one or more victim radios and if the root clock frequency interferes with a victim radio then configuring the aggressor radio with a new root clock frequency that does not interference with the one or more victim radios.

There is further provided in accordance with the invention, a distributed coexistence system incorporating aggressor and victim radios comprising a notification unit in each victim radio operative to generate victim messages incorporating receive (RX) information, a coexistence bus coupled to the aggressor and victim radios, the coexistence bus operative to communicate victim messages from victim radios to aggressor radios and a coexistence control unit associated with each aggressor radio, each coexistence control unit operative to configure a root clock frequency selected so as not to interfere with the frequency band of victim radios.

There is also provided in accordance with the invention, an apparatus for distributed coexistence between a plurality of radios including aggressor and victim radios comprising a coexistence bus coupled to the plurality of radios, the coexistence bus operative to provide communications between the plurality of radios, a coexistence control unit associated with each radio, each coexistence control unit operative to transmit victim messages incorporating receive (RX) information to other radios over the coexistence bus, receive victim messages incorporating receive (RX) information from other radios over the coexistence bus, first determine the frequency spurs and harmonics potentially generated from a current root clock frequency, second determine whether the frequency spurs and harmonics potentially interfere with the frequency band of other radios and if potential interference is detected, select a new root clock frequency so as to avoid interference with other radios.

There is further provided in accordance with the invention, a multi-radio device comprising a plurality of co-located radios, a plurality of coexistence control units, each coexistence control unit associated with a respective radio, a coexistence bus coupled to the plurality of radios, the coexistence bus operative to provide communications between the plurality of coexistence control units, each coexistence unit operative to transmit victim messages incorporating receive (RX) information to other radios over the coexistence bus, receive victim messages incorporating receive (RX) information from other radios over the coexistence bus, first determine the frequency spurs and harmonics potentially generated from a current root clock frequency, second determine whether the frequency spurs and harmonics potentially interfere with the frequency band of other radios and if potential interference is detected, select a new root clock frequency so as to avoid interference with other radios.

BRIEF DESCRIPTION OF THE DRAWINGS

The invention is herein described, by way of example only, with reference to the accompanying drawings, wherein:

FIG. 12 is a flow diagram illustrating the method of the present invention of determining the root clock;

FIG. 13 is a flow diagram illustrating the reception initiation method of the present invention;

FIG. 14 is a flow diagram illustrating the reception termination method of the present invention;

DETAILED DESCRIPTION OF THE INVENTION

Notation Used Throughout

Figure 1:
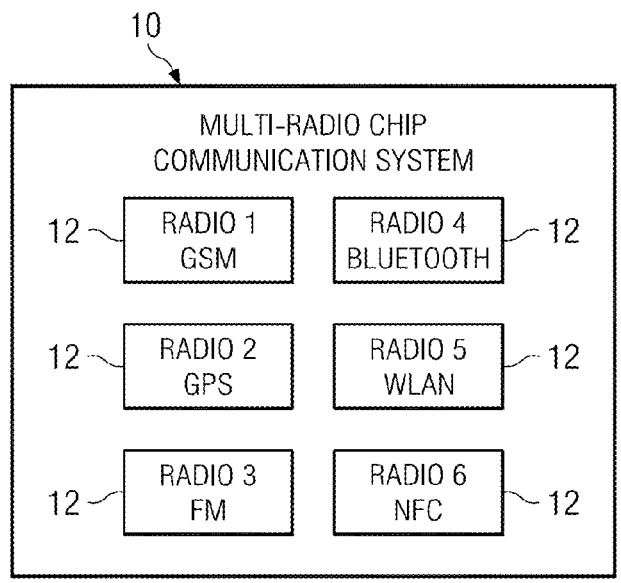
FIG. 1 is a block diagram illustrating an example prior art multi-radio communication system.
Figure 2:
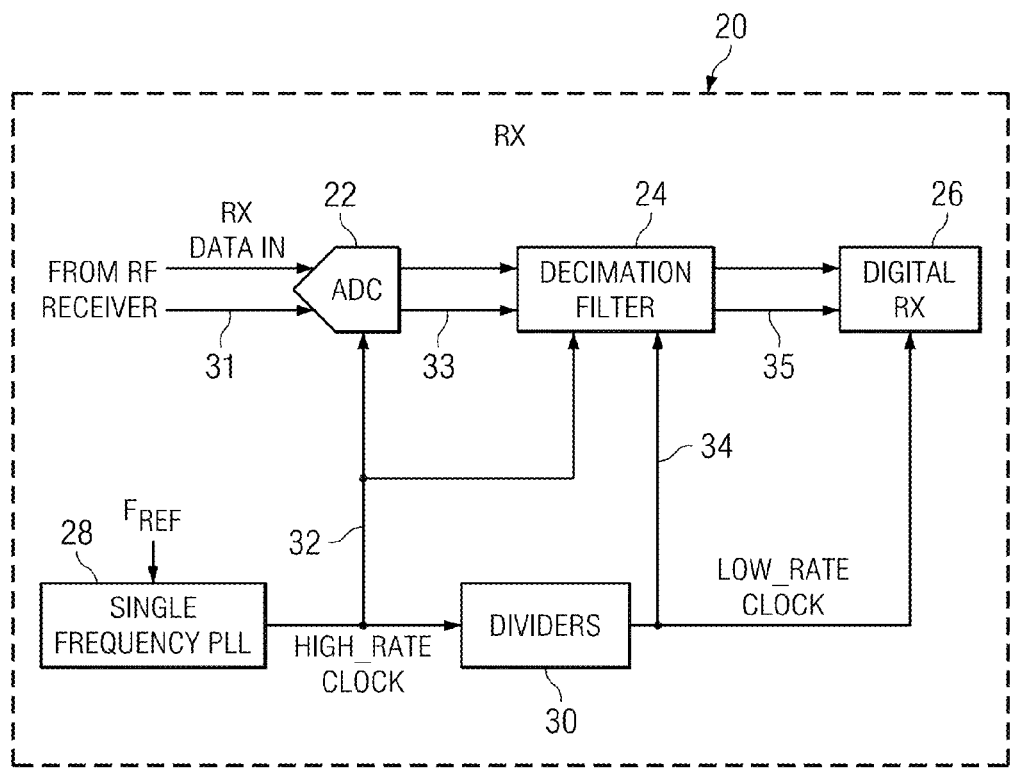
FIG. 2 a first example prior art receiver (RX) circuit utilizing a single frequency PLL.
Figure 3:
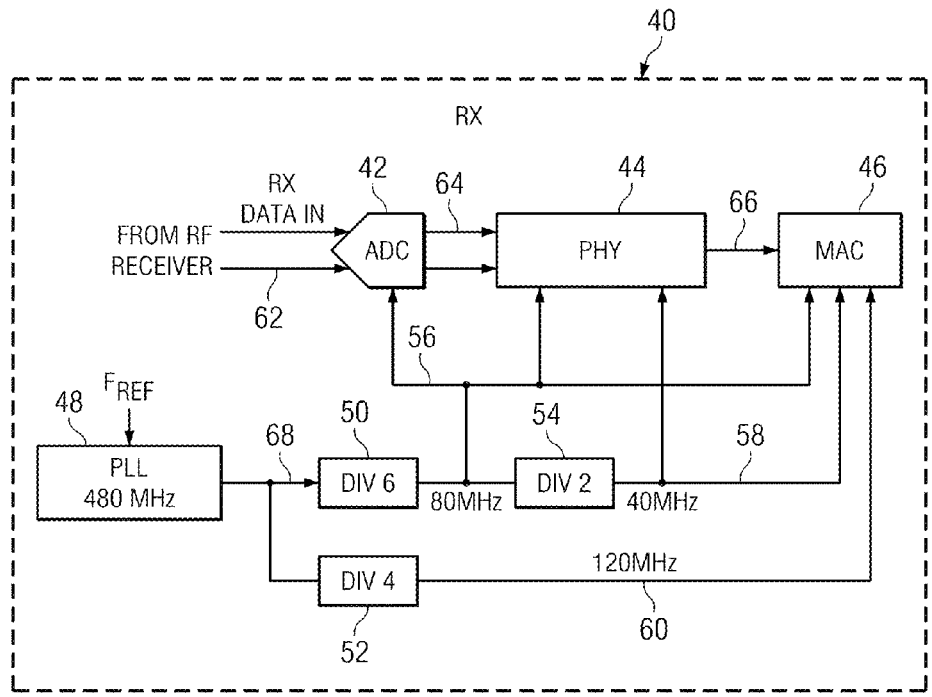
FIG. 3 a second example prior art receiver (RX) circuit utilizing a single frequency PLL.
Figure 4:
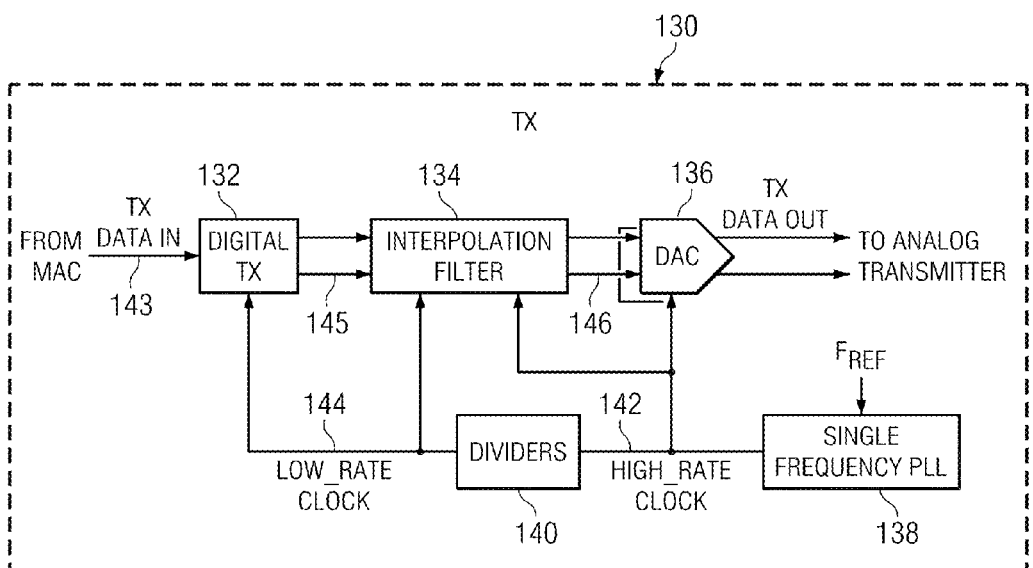
FIG. 4 an example prior art transmitter (TRX) circuit utilizing a single frequency PLL.
Figure 5:
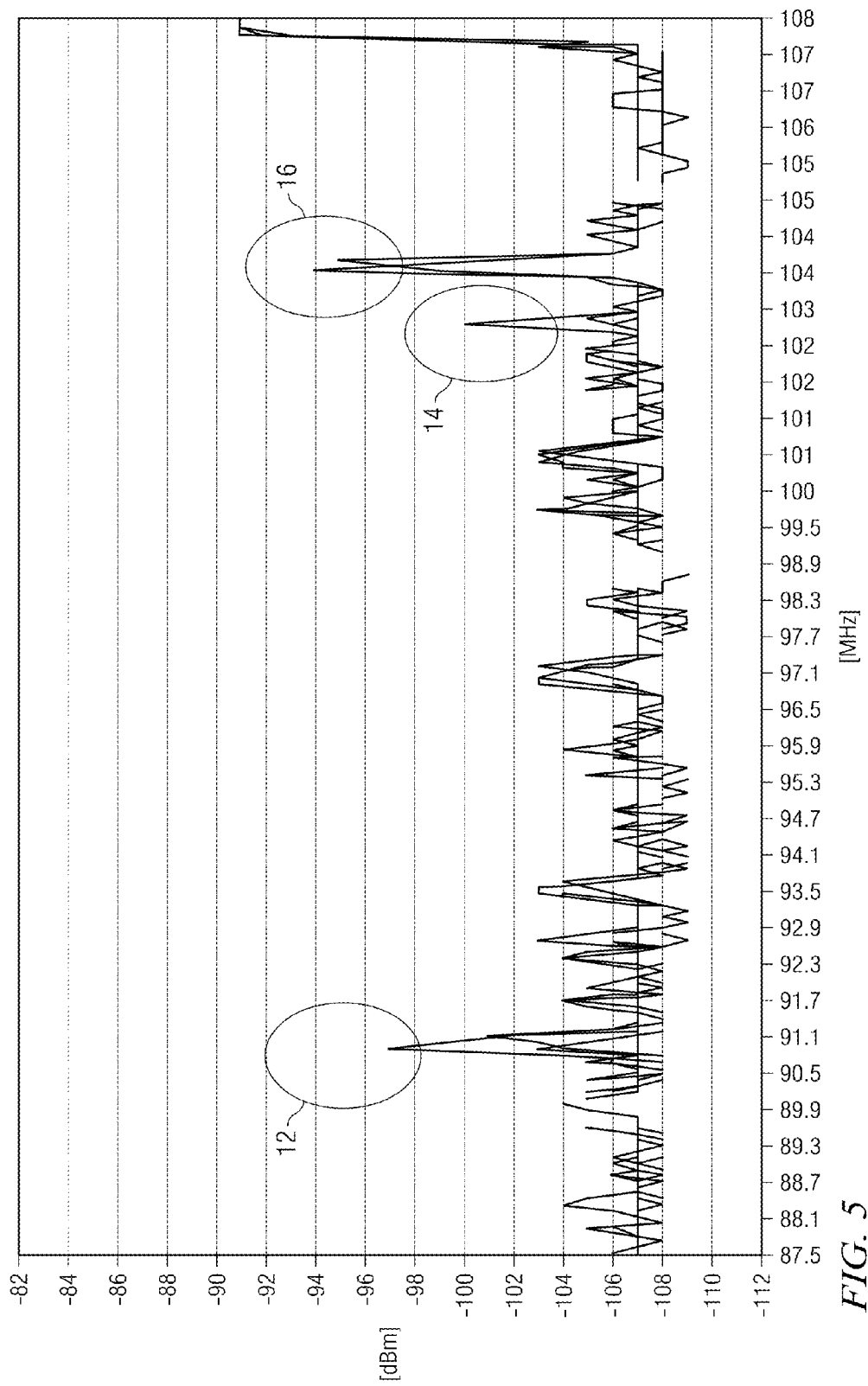
FIG. 5 is a prior art graph illustrating FM sensitivity versus channel with Bluetooth in active modes.

The following notation is used throughout this document.

| Term | Definition |
|---|---|
| AC | Alternating Current |
| ADC | Analog to Digital Converter |
| ASIC | Application Specific Integrated Circuit |
| AVI | Audio Video Interface |
| BMP | Windows Bitmap |
| BW | Bandwidth |
| CMOS | Complementary Metal Oxide Semiconductor |
| CPU | Central Processing Unit |
| DAC | Digital to Analog Converter |
| dB | Decibel |
| DC | Direct Current |
| DCXO | Digitally Controlled Crystal Oscillator |
| DRP | Digital RF Processor or Digital Radio Processor |
| DSL | Digital Subscriber Line |
| DSP | Digital Signal Processor |
| EDGE | Enhanced Data Rates for GSM Evolution |
| EEPROM | Electrically Erasable Programmable Read Only Memory |
| EM | Electromagnetic |
| EPROM | Erasable Programmable Read Only Memory |
| FCC | Federal Communications Commission |
| FCW | Frequency Command Word |
| FEM | Front End Module |
| FIFO | First in First Out |
| FM | Frequency Modulation |
| FPGA | Field Programmable Gate Array |
| FREF | Frequency Reference |
| GGE | GSM/GPRS/EDGE |
| GMSK | Gaussian Minimum Shift Keying |
| GPRS | General Packet Radio Service |
| GPS | Global Positioning System |
| GSM | Global System for Mobile communications |
| HDL | Hardware Description Language |
| I/F | Interface |
| IC | Integrated Circuit |
| IEEE | Institute of Electrical and Electronics Engineers |
| IIR | Infinite Impulse Response |
| JPG | Joint Photographic Experts Group |
| LAN | Local Area Network |
| LFSR | Linear Feedback Shift Register |
| MAC | Media Access Control |
| MAP | Media Access Protocol |
| MP3 | MPEG-1 Audio Layer 3 |
| MPG | Moving Picture Experts Group |
| PC | Personal Computer |
| PCI | Personal Computer Interconnect |
| PCS | Personal Communications Service |
| PDA | Personal Digital Assistant |
| PLL | Phase Locked Loop |
| PM | Phase Modulation |
| PN | Pseudo-Random |
| PNA | Personal Navigation Assistant |
| PSD | Power Spectral Density |
| RAM | Random Access Memory |
| RAT | Radio Access Technology |
| RF | Radio Frequency |
| ROM | Read Only Memory |
| RTC | Real Time Clock |
| RX | Receiver |
| SDIO | Secure Digital Input/Output |
| SEM | Spectral Emission Mask |
| SIM | Subscriber Identity Module |
| SNR | Signal to Noise Ratio |
| SoC | System on Chip |
| SPI | Serial Peripheral Interconnet |
| TV | Television |
| TX | Transmitter |
| USB | Universal Serial Bus |
| UWB | Ultra Wideband |
| VCO | Voltage Controlled Oscillator |

-continued

| Term | Definition |
| --- | --- |
| WCDMA | Wideband Code Division Multiple Access |
| WiFi | Wireless Fidelity |
| WiMAX | Worldwide Interoperability for Microwave Access |
| WiMedia | Radio platform for UWB |
| WLAN | Wireless Local Area Network |
| WMA | Windows Media Audio |
| WMAN | Wireless Metropolitan Area Network |
| WMV | Windows Media Video |
| WPAN | Wireless Personal Area Network |
| ZIF | Zero-IF |

DETAILED DESCRIPTION OF THE INVENTION

The present invention is a novel and useful apparatus for and method of coexistence for mitigating interference in a single chip radio and/or a multi-radio (i.e. multi-transceiver) communications device. The coexistence mechanism of the present invention enables coexistence 'friendly' radio IPs that are capable of shifting their clock frequencies thereby avoiding frequency bands of potential victim radios. A coexistence mechanism attempts to solve the coexistence problem through frequency agility on the aggressor radio side (rather than by mitigating the effect of interference on the victim radio side) in order to avoid any harmonics from the aggressor's clock scheme falling in the operating frequency band of the victim radio, and in turn causing degradation to its performance.

The coexistence mechanism described herein is suitable for use in applications that employ single chip radios and/or multi-radio communication devices where RF and clock signal interference between radios and within each radio itself is an occurring problem. An example application is provided of a mobile device, e.g., cellular phone, PDA, etc., that incorporates the coexistence mechanism of the present invention in the co-located multiple radios.

Although the coexistence mechanism is applicable to numerous wireless communication standards and can be incorporated in numerous types of wireless or wired communication devices such as multimedia player, mobile station, cellular phone, PDA, DSL modem, WPAN device, etc., it is described in the context of a multi-transceiver SoC based transmitter that may be adapted to comply with a particular wireless communications standard such as GSM, Bluetooth, EDGE, WCDMA, WLAN, WiMax, etc. It is appreciated, however, that the invention is not limited to use with any particular communication standard and may be used in optical, wired and wireless applications.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10 Base-T, 100Base-T or 1000Base-T over shielded or unshielded twisted pair wiring. The terms communications channel, link and cable are used interchangeably. The notation DRP is intended to denote either a Digital RF Processor or Digital Radio Processor. References to a Digital RF Processor infer a reference to a Digital Radio Processor and vice versa.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal navigation assistants (PNAs), personal media player/recorders, cellular telephones, handheld devices, and the like.

The term aggressor radio is defined as a radio that interferes with other radios in the same system (either on the same chip die or in a device having co-located multiple radios). A victim radio is defined as a radio that suffers degradation due to the operation of other radios in the system.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention can be implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device/Cellular Phone/PDA/PNA

Figure 6:
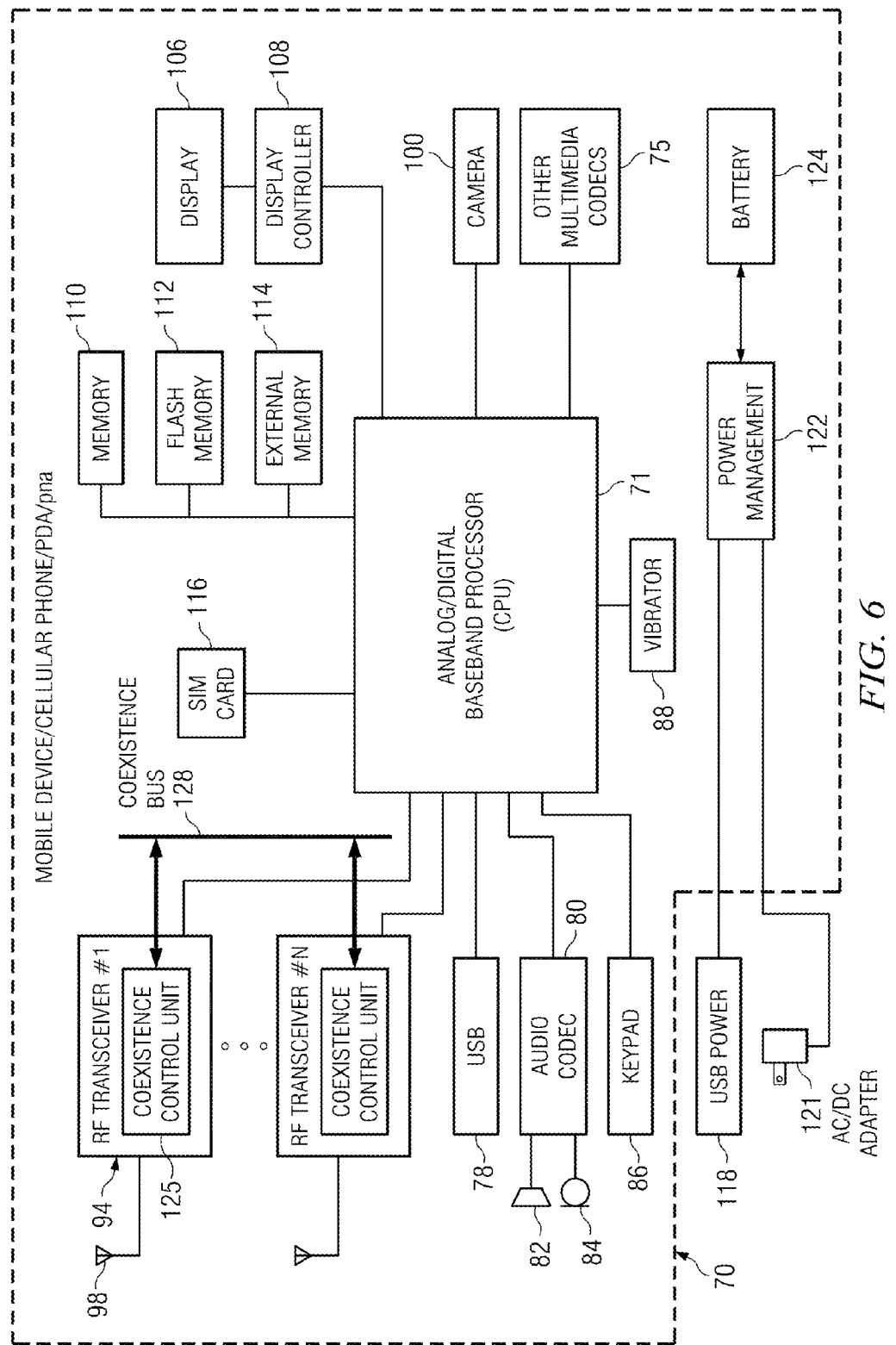
FIG. 6 is a block diagram illustrating an example single chip radio incorporating the coexistence mechanism of the present invention.

A simplified block diagram illustrating an example mobile communication device incorporating the coexistence mechanism of the present invention within multiple radio transceivers is shown in FIG. 6. Note that the mobile device may comprise any suitable wired or wireless device such as multimedia player, mobile communication device, cellular phone, smartphone, PDA, PNA, Bluetooth device, etc. For illustration purposes only, the device is shown as a mobile device, such as a cellular phone. Note that this example is not intended to limit the scope of the invention as the coexistence mechanism of the present invention can be implemented in a wide variety of communication devices.

The mobile device, generally referenced 70, comprises a baseband processor or CPU 71 having analog and digital portions. The mobile device may comprise a plurality of RF transceivers 94 and associated antennas 98. RF transceivers for the basic cellular link and any number of other wireless standards and Radio Access Technologies (RATs) may be included. Examples include, but are not limited to, Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN network; near field communications; UWB; FM to provide the user the ability to listen to FM broadcasts as well as the ability to transmit audio over an unused FM station at low power, such as for playback over a car or home stereo system having an FM receiver, GPS, TV tuner, etc. One or more of the RF transceivers may comprise additional antennas to provide antenna diversity which yields improved radio performance. The mobile device may also comprise internal RAM and ROM memory 110, Flash memory 112 and external memory 114.

Several user-interface devices include microphone(s) 84, speaker(s) 82 and associated audio codec 80 or other multimedia codecs 75, a keypad 86 for entering dialing digits and for other controls and inputs, vibrator 88 for alerting a user, camera and related circuitry 100 and display(s) 106 and associated display controller 108. A USB or other interface connection 78 (e.g., SPI, SDIO, PCI, etc.) provides a serial link to a user's PC or other device. SIM card 116 provides the interface to a user's SIM card for storing user data such as address book entries, user identification, etc.

The RF transceivers 94 also comprise the coexistence control unit 125 constructed in accordance with the present invention. Each coexistence control unit is coupled to a coexistence bus 128 that enables communications between the coexistence control units in the various RF transceivers. The coexistence control units 125 are adapted to implement the coexistence mechanism of the present invention as described in more detail infra. In operation, the coexistence mechanism may be implemented as hardware, software or as a combination of hardware and software. Implemented as a software task, the program code operative to implement the coexistence mechanism of the present invention is stored in one or more memories 110, 112 or 114 or local memories within the baseband.

Portable power is provided by the battery 124 coupled to power management circuitry 122. External power is provided via USB power 118 or an AC/DC adapter 121 connected to the battery management circuitry 122, which is operative to manage the charging and discharging of the battery 124.

Modulation Bandwidth Reduction Mechanism

In accordance with the invention, the coexistence mechanism is operative to implement frequency agility on the aggressor side, in order to avoid any harmonics from the aggressor's clock scheme falling in the victim's operating frequency band, and in turn causing degradation to its performance.

Application of such a scheme requires information sharing between the various radios in the system. Information sharing is achieved using a coexistence bus that connects all radios together. Over the bus, the radios are capable of sending status information related to their operation (e.g., operation mode, frequency of operation, channel, bandwidth, etc).

Each of the potential aggressor radios in the system, implements control logic to calculate its operating frequency (also referred to as the root clock frequency), such that it would avoid interfering with the potential victim radios currently operating. The result of this calculation is a configuration of the clock generation circuits in the RX and/or TX chains.

The frequency agility mechanism is implemented in the RX/TX chains utilizing (1) a PLL which can generate a range of frequencies, (2) clock dividers to divide the PLL frequency to lower rate clocks and (3) (in one embodiment) a Real Time Clock (RTC) block which functions to generate a fixed rate clock out of a variety of clock rates, according to configuration parameters.

Figure 7:
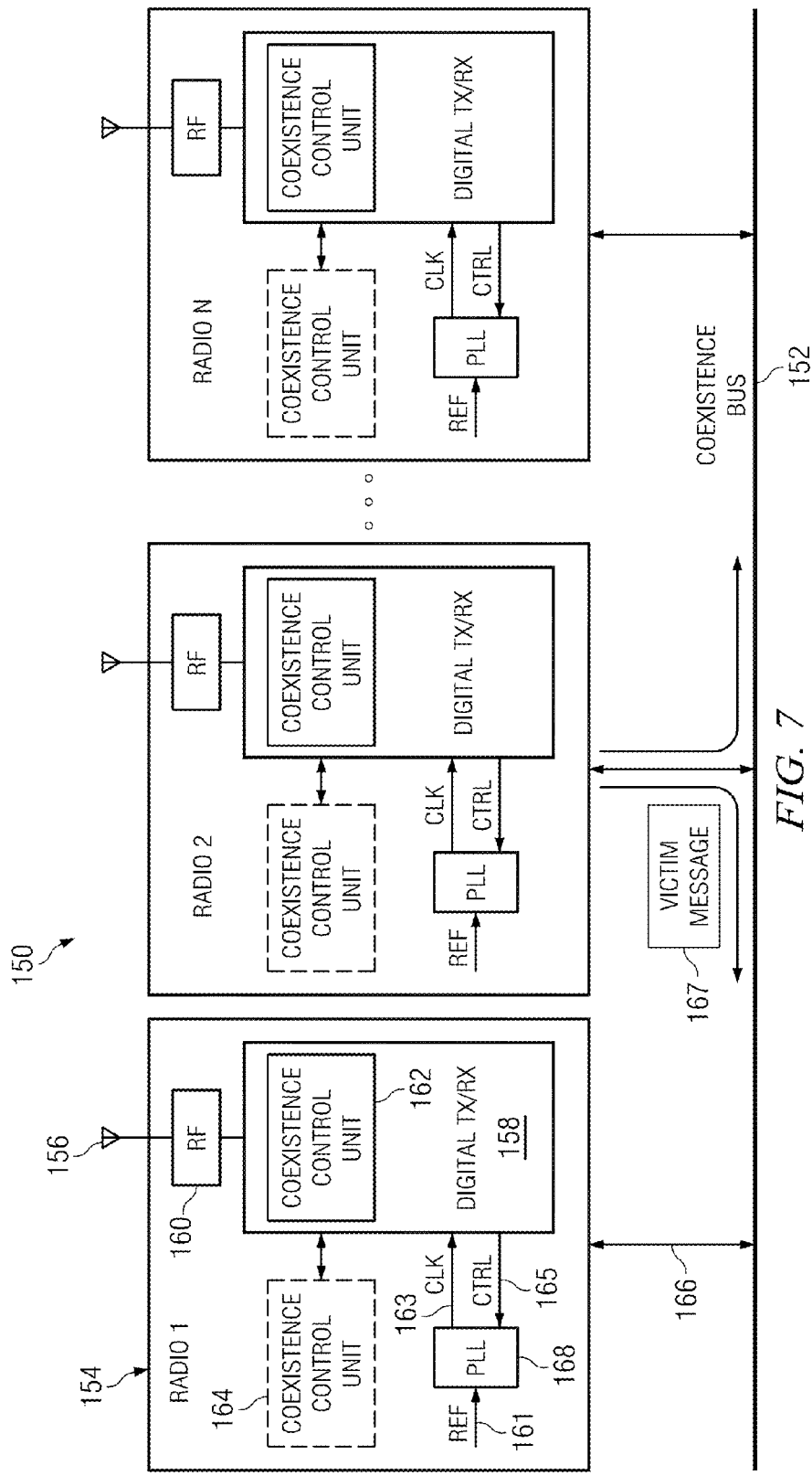
FIG. 7 is a block diagram illustrating an example embodiment of the coexistence mechanism of the present invention as applied to a multi-radio communications device.

A block diagram illustrating an example embodiment of the coexistence mechanism of the present invention as applied to a multi-radio communications device is shown in FIG. 7. The coexistence system, generally referenced 150, comprises a plurality of N radios (i.e. transceivers) 154 coupled to shared coexistence bus 152. Each radio 154 comprises one or more RF modules 160 coupled to antenna(s) 156, PLL 168, locked onto a reference signal REF 161 and digital TX/RX circuit block 158. Each digital TX/RX circuit comprises a coexistence control unit 162. Note that although the coexistence control unit 162 is shown implemented within the digital TX/RX, in an alternative embodiment, the coexistence control unit may be implemented external to the digital TX/RX circuit as shown by dashed block 164. Thus, one coexistence control unit is associated with each radio. All coexistence control units 162/164 are able to communicate with one another via the coexistence bus 152. Together, the coexistence control units implement the distributed coexistence mechanism of the present invention as described in more detail infra.

Note that each radio comprises at least one PLL 168. The PLL is locked on a reference signal 161 and functions to generate the root clock 163. The PLL coupled with the digital circuitry 162 implements a digital receiver and transmitter. Digital circuitry 158 is coupled to RF circuitry 160, which functions to convert digital signals to analog and modulate them on a carrier signal and vice versa. The RF circuit is connected to antenna 156. As described supra, the coexistence control unit circuit is located in the digital portion of the transceiver (or separately) and may be implemented as a microcontroller or a shared or dedicated digital circuit. The coexistence control circuit functions to control the PLL via clock divider controls 165. Note that both receivers and transmitters can act as aggressor circuits through the coupling of digital clocks, their divisions, their harmonics or their divisions' harmonics.

Each transceiver may comprise either a cellular transceiver, connectivity transceiver such as Bluetooth, WLAN 802.11, FM receiver and transmitter, NFC or receiver such as GPS or an implementation of any electromagnetic (EM) wave transmitting and receiving apparatus.

The plurality of transceivers 154 are connected to the digital coexistence bus 152, on which victim messages 167 are sent. The messages contain information on the properties of the victim radio such as reception band, center frequency, bandwidth, etc. Victim messages are received by the other transceivers. In this example, the victim message 167 is generated by radio #2 and sent to all other radios on the bus (i.e. #1 and #3 through #N).

The receiving transceivers can be viewed effectively as potential aggressors to the victim radio transmitting the victim message. All potential aggressors analyze the victim message using their dedicated or shared control circuit 162/164. The information is stored (after pre-processing) in local memory such that all potential victim information can be accessed by the control circuit at a later time. If a potential aggressor is in transmit mode and the current root clock 163 generated by the PLL or any of its derivatives (typically, digital circuit 158 generates several divided down versions of the root clock) or the harmonics thereof interfere (i.e. fall within the receive band) with the victim radio, then coexistence control unit 162/164 searches and finds a root frequency that does not interfere with any victim radio within the system. To perform this, the coexistence control unit recalls the information stored within its memory (from previous messages) and checks it against a set of pre-computed root clock frequencies. If the check is successful (i.e. no interference found), transmission by the aggressor transmitter proceeds. Note that although the coexistence bus is shown in the example presented herein as a shared topology, it is appreciated that any bus topology, shared, star, daisy-chained or other may be implemented.

Figure 8:
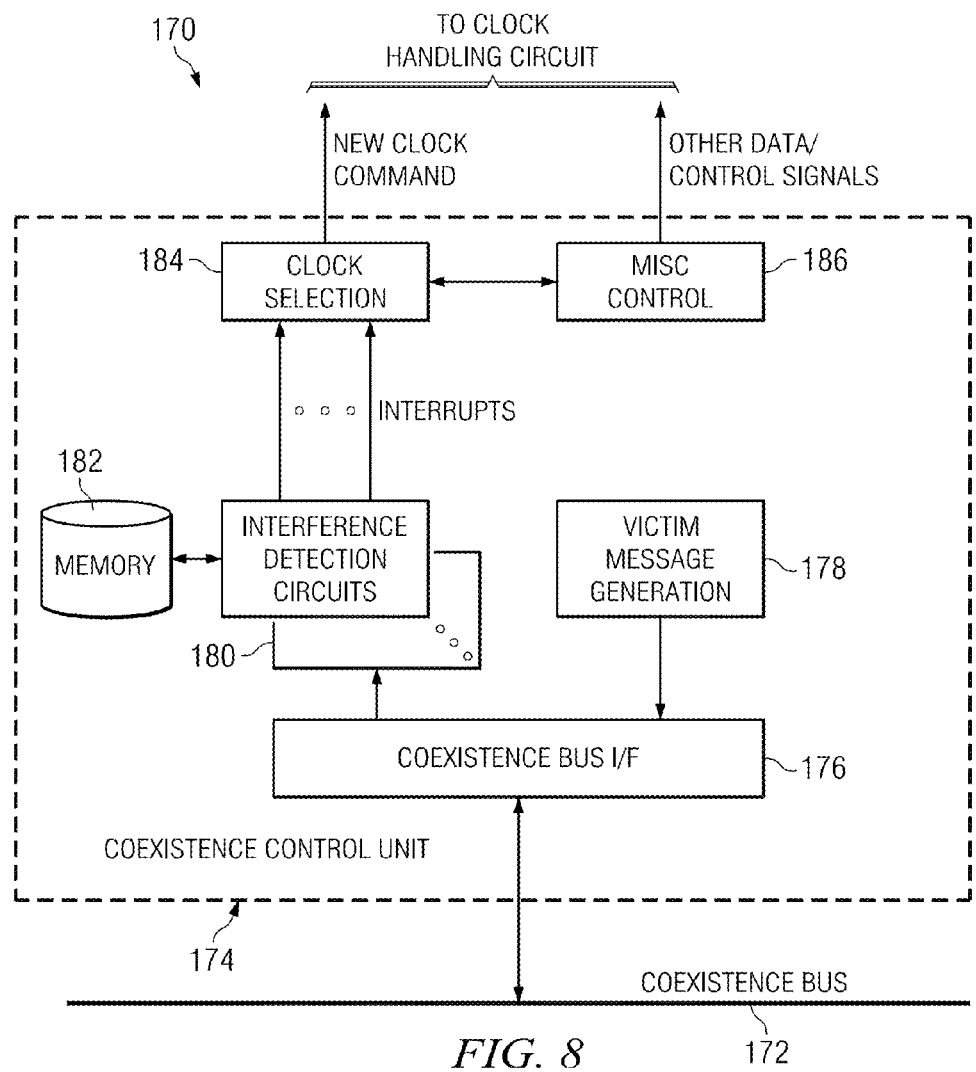
FIG. 8 is a block diagram illustrating the coexistence control unit of the present invention in more detail.

A block diagram illustrating the coexistence control unit of the present invention in more detail is shown in FIG. 8. The coexistence scheme, generally referenced 170, comprises a coexistence control unit 174 coupled to a coexistence bus 172. The coexistence control unit 174 comprises coexistence bus interface (I/F) 176, one or more interference detection circuits 180, victim message generation block 178, memory 182, clock selection block 184 and miscellaneous control block 186.

In operation, the coexistence bus interface 176 provides the interface between the coexistence circuitry and other coexistence control units on the bus. Messages are transmitted and received by each of the control units via the bus interface. The interference detection circuits 180 function to detect a potential interference problem between the radio the control unit resides in and other radios in the system. Interference with other radios is detected using information received from the coexistence control units in other radios via victim messages passed over the bus. Information received is stored in memory 182. Victim message generation block 178 functions to generate victim messages containing receiver related information such as center frequency, frequency range, channels in use, etc. This information is sent to other coexistence control units in order to avoid interference by their respective radio transmitters.

Based on the output of the interference detection circuits 180, the clock selection circuit 184 functions to select an operating clock frequency that would not interfere with other radios in the system. Once selected, a command indicating the new clock frequency is issued to the clock handling circuit. A miscellaneous control block 186 generates other related control/command signals in accordance with the particular implementation of the clock handling circuit. An example implementation of block 184 is shown in FIG. 12.

Figure 9:
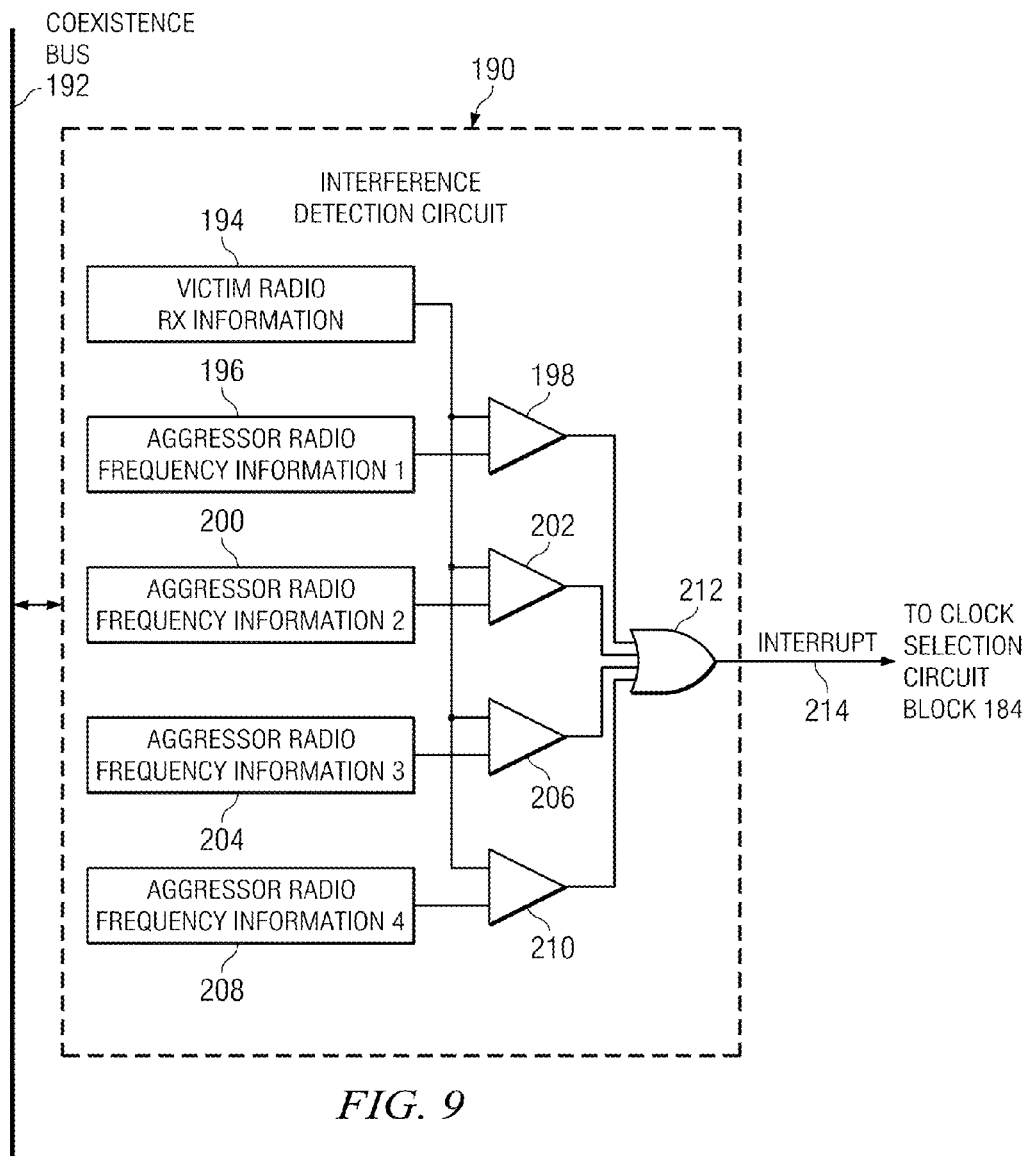
FIG. 9 is a block diagram illustrating the interference detection circuit of the present invention in more detail.

A block diagram illustrating the interference detection circuit of the present invention in more detail is shown in FIG. 9. The interference detection circuit, generally referenced 190, comprises a plurality of registers/data memory or other storage means for storing information about the aggressor and victim radios. This information is used to detect a condition where the aggressor radio would potentially interfere with the victim radio. In particular, the interference detection circuit 190 comprises a victim radio RX information register 194, four aggressor radio frequency information registers 196, 200, 204, 208, four comparators 198, 202, 206, 210 and OR gate 212.

In operation, RX information from the victim radio is sent in one or more victim messages to other radios, which for this analysis can be considered potential aggressor radios. The information is stored in register block 194. The information may comprise any information related to reception in the victim radio, such as, center frequency, channel number, frequency bandwidth, operating mode, etc. Information related to the transmit operation of the aggressor radio is stored in the aggressor information register blocks 196, 200, 204, 208, e.g., root clock frequency, its derivatives or harmonics, etc., or any other relevant TX information. Note that any number of register blocks may be used with four shown herein for example purposes only. Victim radio information is obtained from other radios over the coexistence bus 192 via the coexistence bus I/F 176 (FIG. 8).

The data from the victim radio RX information register block is applied to each of the comparators. The output of each aggressor information register block is input to one of the comparators. If any of the comparisons indicate that the aggressor radio will potentially interfere with the victim radio frequencies, the output of OR gate 212 becomes active and an interrupt 214 is generated to the clock selection block 184 (FIG. 8).

It is noted that interference detection circuitry is provided for each radio in the system that can be a potential victim. For example, in a system with five radios, each radio would comprise four interference detection circuits, one for each of the other four radios that may be potential victims of that aggressor radio.

Upon receipt of an interrupt, the clock selection circuit 184 functions to determine a new root clock to be used by the transmitter circuitry in the aggressor radio. The new root clock is selected using any suitable means, such as formula, algorithm, table populated with radio/standard specific parameters, etc. For example, in the case of a WLAN aggressor radio, the possible channels or frequencies can be determined a priori and stored in a table. Upon receipt of an interrupt, the new root clock can be selected simply by accessing the table based on the victim RX information received.

Figure 10:
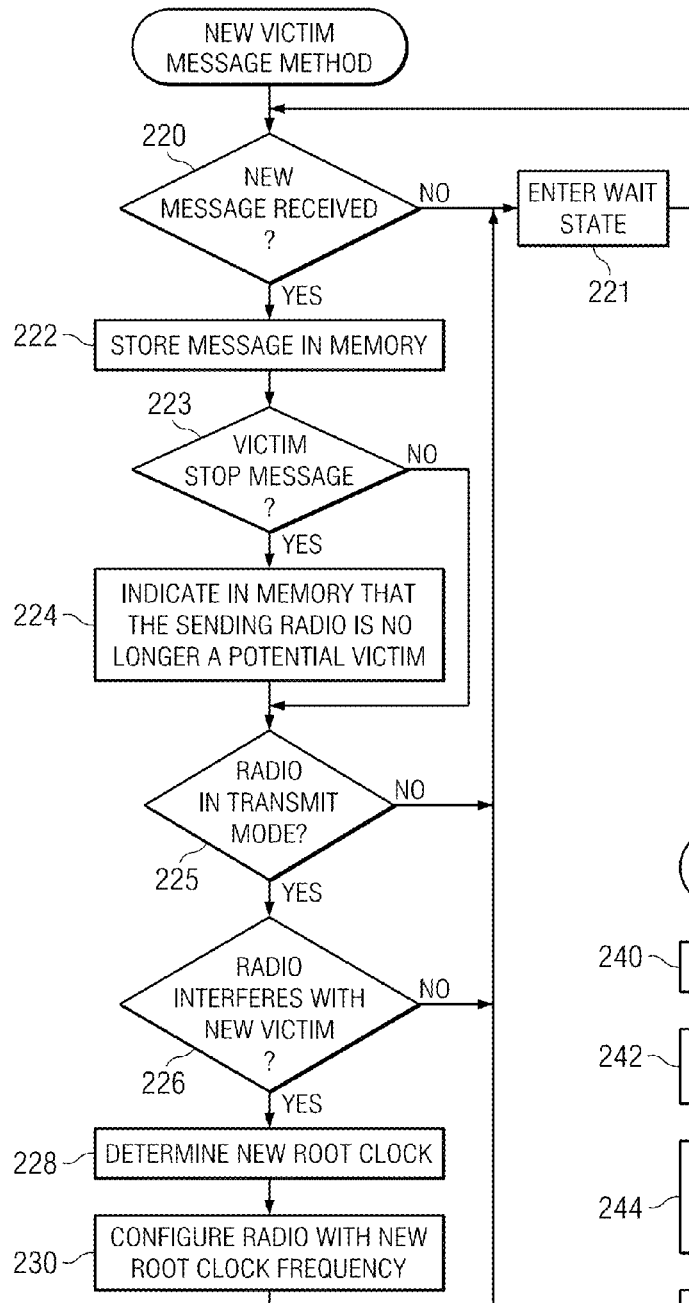
FIG. 10 is a flow diagram illustrating the new victim message method of the present invention.

A flow diagram illustrating the new victim message method of the present invention is shown in FIG. 10. This method is performed by the coexistence bus interface or other control logic circuit within the coexistence control unit. After starting, the control circuit checks whether a new victim message has been received (step 220). If no message has been received, the control circuit stops and enters a wait state until it needs to poll for new messages again (step 221). Once a new message arrives, the control circuit stores its contents in memory (step 222). Note that a message can comprise either a new victim message or a victim stop message. A victim stop message (step 223), indicates that a transceiver has stopped receiving and is no longer a potential victim. An indication is made in memory that the message sending transceiver is no longer a potential victim (step 224).

It is then checked whether the aggressor radio (i.e. the radio performing the method) is in transmit mode of operation (step 225). If it is not, the circuit stops and enters a wait state until it needs to poll again (step 221). If it is in transmit mode, it is checked whether the aggressor does or would potentially interfere with the new victim radio, i.e. whether the current root frequency of the transmitter interferes with the new (i.e. latest victim) frequency band (step 226). If not, the control circuit stops. If it does interfere, the control circuit computes/determines a new root clock frequency that does not interfere with all other potential victims (step 228). Once selected, the PLL and digital circuits in the aggressor radio is configured with the new root clock frequency and transmit operations proceed (step 230). The control circuit then stops and waits for a timer to poll (step 221).

It is noted that the actual scheduling of the logic of this method to run can either be based on a polling sequence based on a timer or on an interrupt circuit based on the reception of a new victim message.

Figure 11:
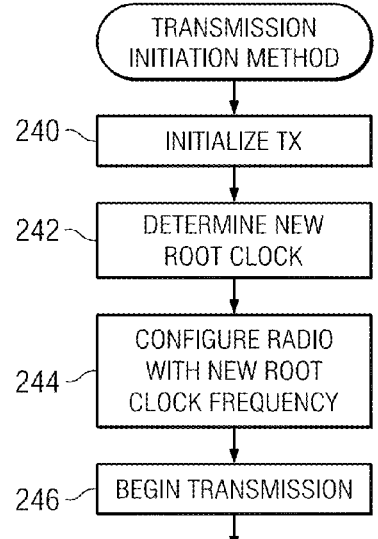
FIG. 11 is a flow diagram illustrating the transmission initiation method of the present invention.

A flow diagram illustrating the transmission initiation method of the present invention is shown in FIG. 11. The sequence shown is used to initiate transmission for a given transmitter. After initializing (step 240), the clock selection circuit block 184 (FIG. 8) determines/computes/selects a new root clock frequency (step 242) using the method of FIG. 12 described infra. Once a new root clock is obtained, the PLL 168 and digital circuit 158 (FIG. 7) are configured with the new root clock (step 244) and transmission can begin (step 246).

A flow diagram illustrating the method of the present invention of determining a new root clock is shown in FIG. 12. In this method, the coexistence control logic is programmed or hard wired with a set of root frequencies $f_L$, L=1 ... N (for N possible root clock frequencies) defined a priori. Alternatively, the root frequencies can be computed/selected/determined dynamically on the fly. After initializing, a variable index I is set to the value 1 (step 250). Predefined frequency $f_I$ is then checked for interference against the victim radio frequency band information stored in memory for all victim radios currently receiving (step 252).

If the root frequency $f_I$, its derivatives or harmonics fall within any of the potential victims receive frequency bands, the controller continues to step 254, thus incrementing the variable I and rejecting the current proposed root frequency $f_I$. The stopping criterion is then checked (step 256), i.e. the control unit has exhausted all possible predefined root clock frequencies. If all possible predefined root clock frequencies have not been exhausted, the method returns to step 254 to check the next root frequency for interference with the victim radio. If all possible predefined root clock frequencies have been exhausted, an error condition is reported (step 258) and the method stops (i.e. no root frequency can be found that does not interfere with the victim radio).

If the root frequency $f_I$, its derivatives or harmonics do not fall within any of the potential victims receive frequency bands (step 252). The control circuit then sets the new root clock frequency to be $f_I$ (step 260) and returns (step 258).

An example pseudo-code implementation of step 252 (FIG. 12) is presented below in Listing 1. A description is provided below.

Listing 1: Interference detection scheme pseudo-code

```
for J=1 to M {                                    // step 500
    F = F_I/N_J                                    // step 502
    K = 1                                          // step 504
    while (K*F <= Max_Frequency) {                 // step 506
        F_h = K*F                                  // step 508
        for Z = 1 to Max_Active_Victims {          // step 510 if((F_h > C_z - BW_z/2) and (F_h ≤ C_z + BW_z/2)) then {    // step 511 return TRUE;                       // step 512
            } end if
        } end for                                  // step 514
        K = K + 1                                  // step 516
    } end while                                    // step 518
} end for                                          // step 520
return FALSE                                       // step 522
```

First all clock divisions ratios in the aggressor are defined as $N_1, N_2, \ldots N_M$. Therefore, the clocks generated within the system have the frequency set $f_I/N_1, f_I/N_2, \ldots, f_I/N_M$. The process iterates over the number of possible divisions of the root clock M (step 500). Next, the divided clock frequency F is computed (step 502). The variable K, which represents the harmonic number, is then set to the fundamental 1 (step 504). The routing then checks using a 'while' loop whether the harmonic frequency K*F exceeds the maximum frequency to be checked Max_Frequency (step 506). The frequency of the harmonic $F_h$ is then computed (step 508).

The routine then iterates via a 'for' loop over the number of active victims (step 510). The aggressor condition is then checked (step 511). If the harmonic frequency $F_h$ falls within the victim band (i.e. between the frequencies $$C_z - \frac{BW_z}{2}$$

and $$C_z + \frac{BW_z}{2},$$

where $C_z$ is the center frequency of the $z^{th}$ victim and $BW_z$ is the bandwidth of the $z^{th}$ victim) then a true condition is returned signifying that root frequency $F_I$ interferes with at least one possible victim (step 512). The entire algorithm then ceases. The end of the for loop of step 510 is signified in step 514. The variable index K is the incremented thereby moving to the next harmonic (step 516). The end while in step 518 signifies the end of the while condition of step 506. The end for in step 520 signifies the end of the for loop of step 500. Finally, if all checks in step 512 were not taken, a false condition in step 522 is returned indicating that the root clock $F_I$, its harmonics, divisions and division harmonics do not fall within any potential victim frequency band.

A flow diagram illustrating the reception initiation method of the present invention is shown in FIG. 13. This method illustrates the sequence used by the coexistence control unit for initiating reception for any given receiver. After initializing (step 270), the transmitter generates and transmits a victim message onto the coexistence bus containing information about it's receive band (i.e. center frequency, bandwidth, start and stop frequencies, etc.) (step 272). The controller then proceeds to begin the reception process (step 274). The victim message is forwarded to all other radios connected to the bus.

A flow diagram illustrating the reception termination method of the present invention is shown in FIG. 14. This method illustrates the sequence for terminating reception. At some point after initiating reception, a decision to terminate reception is made (step 280). At this point, the control circuit generates and transmits a victim stop message onto the coexistence bus (step 282). This message informs all other potential aggressors that the transceiver sending the message is no longer a potential victim. Reception is then terminated (step 284).

Gated Clock Generator Embodiment

Figure 15:
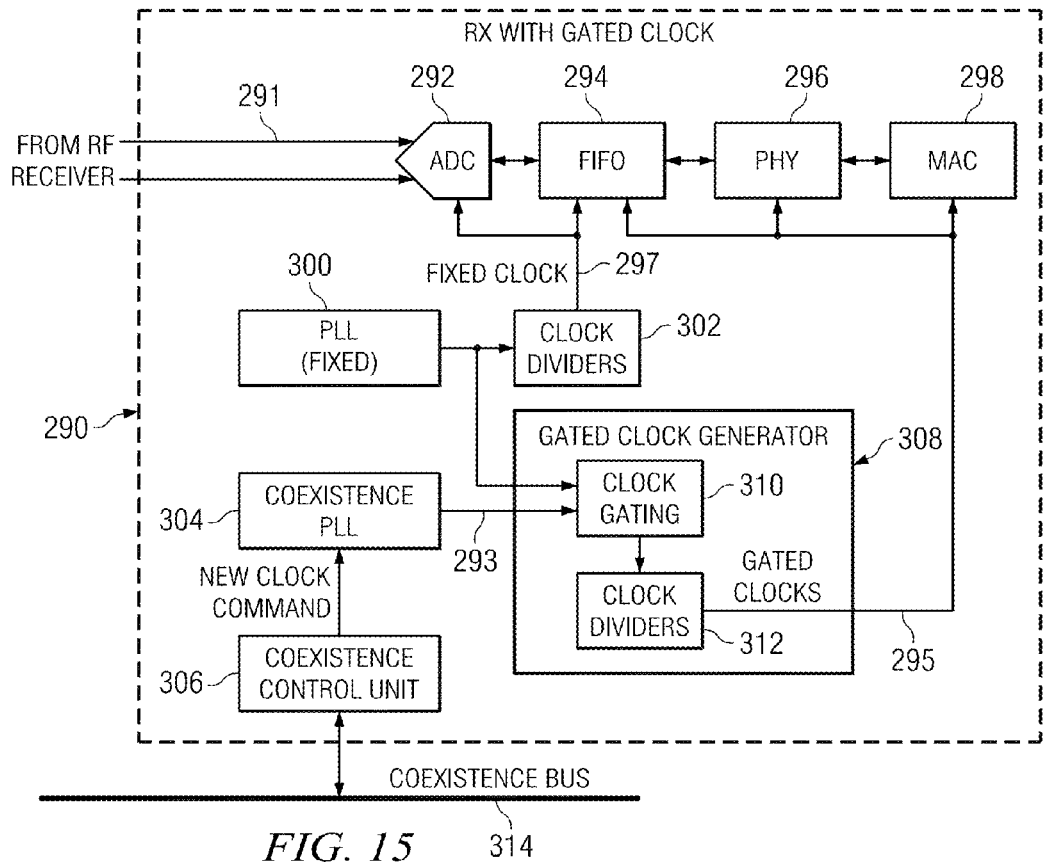
FIG. 15 is a block diagram illustrating an example embodiment of the coexistence mechanism and a gated clock generator.

A block diagram illustrating an example embodiment of the coexistence mechanism and a gated clock generator is shown in FIG. 15. The receiver, generally referenced 290, comprises a coexistence control unit 306 in communication with coexistence bus 314, coexistence PLL 304, fixed clock PLL 300, clock dividers 302, gated clock generator 308 and receiver chain circuitry including ADC 292, FIFO 294, PHY circuit 296 and MAC 298. The gated clock generator 308 comprises the clock gating circuit 310 and clock divider circuit 312.

The circuit 290 is a first example of a receive chain on the aggressor side constructed in accordance with the coexistence mechanism. The signal 291 from the RF receiver (i.e. FEM) is sampled at the ADC and converted to digital. The output of the ADC is input to the FIFO which functions to absorb any slight (instantaneous) timing differences between fixed and gated clocks. The PHY circuit performs decimation, demodulation, etc. of the signal and generates an RX data signal which is input to the MAC. Fixed PLL 300 functions as without the mechanism of the invention to generate a high rate fixed clock. The clock dividers function to divide the high rate clock to one or more fixed rate low rate clocks 297 that are used to clock, for example, the ADC and FIFO circuits.

The coexistence control unit 306 functions as described supra and in accordance with victim messages received over the coexistence bus 314, is informed of other victim radio RX information. Upon detection of potential interference with any of the victim radios, the coexistence control unit generates a new clock command via its clock selection block 184 (FIG. 8). The new clock command comprises the new root frequency that should not interfere with other radios. Based on the new root clock frequency, the coexistence PLL generates a root clock signal 293 that is input to the clock gating circuit 310.

The clock gating circuit functions to generate a gated clock from the fixed clock generated by the fixed PLL 300 and the root clock generated by the coexistence PLL 304. The clock divider circuit 312 performs any required clock division depending on the particular implementation to generate the output gated clock signals 295 used to clock the digital logic including, for example, the FIFO, PHY and MAC circuits. Gated clocks 295 have an average frequency exactly (or substantially close to) the fixed frequency 300 but with instantaneous higher frequencies (i.e. shorter period). This means that PHY block 296 and MAC block 298 will operate most of the time on a higher root frequency than the one generated by PLL 300 but will not operate once the gating is activated. It is noted that no changes whatsoever are required to be implemented for a conventional PHY and MAC from an IP that does not incorporate an implementation of the coexistence mechanism of the present invention. The signal processing within the PHY is operative to consider the sampling frequency to be identical to the one generated by PLL 300.

Figure 16:
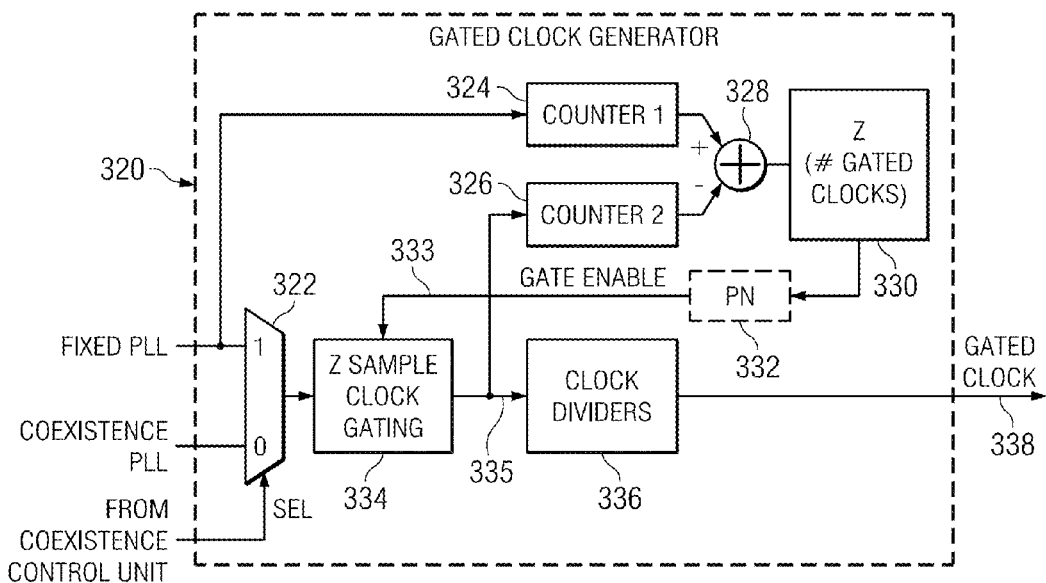
FIG. 16 is a block diagram illustrating an example embodiment of the gated clock generator of the present invention.

A block diagram illustrating an example embodiment of the gated clock generator of the present invention is shown in FIG. 16. The gated clock generator, generally referenced 320, comprises multiplexer 322, z sample clock gating circuit 334, counters 324, 326, adder 328, comparator 330, clock divider circuit 336 and optional pseudo-random (PN) block 332.

In operation, the clock gating circuit is operative to gate the root clock generated by the coexistence PLL by the fixed PLL clock. The gated clock has the original (i.e. fixed) average frequency but different instantaneous frequency during most of the time. The coexistence bus keeps the aggressor radio cognizant of all potential victim receiver bands and the coexistence PLL root clock frequency is shifted accordingly.

For example, consider an 80 MHz fixed clock generated by the fixed PLL. In order to avoid interference with victim radios, the aggressor radio can change its root frequency to 81 MHz. So as to not violate circuitry that conforms to a standard (e.g., cellular transceiver, etc.) that must operate at a particular frequency as required by a wireless standard, the clock gating circuit is operative to generate a new clock that has 80 clock cycles (within an example 1 microsecond time period) but the rate of those 80 clocks is at the 81 MHz rate. The gated clock output of the circuit is actually the 81 MHz clock with one cycle gated out every microsecond. Thus, on average, the 81 MHz clock looks like an 80 MHz clock since the microsecond period contains only 80 clock cycles. Generating the new gated clock to essentially be an 81 MHz clock signal with an 80 MHz number of cycles provides the benefit of moving the original 80 MHz (and its harmonics) spike in the spectrum to a region outside the bandwidth range of the receiver thus eliminating (or significantly reducing) the interference.

The fixed PLL clock enters the multiplexer which is controlled by select signal generated by the coexistence control unit. A select of '1' effectively permits the fixed PLL clock to pass through the circuit with no modification. A second of '0' causes the clock gating circuit to generate the gated clock. Counters 1 and 2 may comprise 4-bit counters. Counter 1 functions to count the number of clocks required (e.g., 80) while counter 2 counts the actual number of clocks generated at the new root clock rate (e.g., 81 MHz). The adder 328 functions to generate the difference between the counter values. When the value of counter 2 exceeds that of counter 1 by z, comparator 330 triggers PN block 332 (if implemented) or clock gating block 334.

The gating enable signal 333 is input to the z sample clock gating circuit 334, which may be implemented as an AND gate or other combination of gates. The gate enable signal functions to gate the root clock from the coexistence PLL by z clocks (e.g., one cycle every microsecond in the example presented herein). The undivided gated clock 335 is divided to generate any number of gated clocks 338 required by the receiver circuit. Optional PN circuit 332 functions to apply a degree of randomness to the number of cycles gated from the coexistence PLL clock This improves the spectrum of the gated clock by reducing the spurs even further without adding any significant delay to the clock, as long as the required clock rate average (e.g., 80 MHz) is maintained. A maximum length linear feedback shift register (LFSR) may be used to implement the PN circuit.

Thus, using the clock gating circuit 320, any desired clock can be generated regardless of the gating pattern and the required average clock rate. Note that it is important that over time the gated clock have a constant average clock rate. The clock rate may vary slightly due to the PN circuit but must be constant over time (i.e. 80 MHz), otherwise the FIFO 294 (FIG. 19) may underflow or overflow. Thus, the length of the FIFO limits the gating mechanism in that the receiver may be able to tolerate excessive variation in clock rate. Another limitation, is that the coexistence PLL rate must be higher than the fixed PLL rate, since the clock generation circuit operates by gating clock cycles and not adding clock cycles.

Figure 17A:
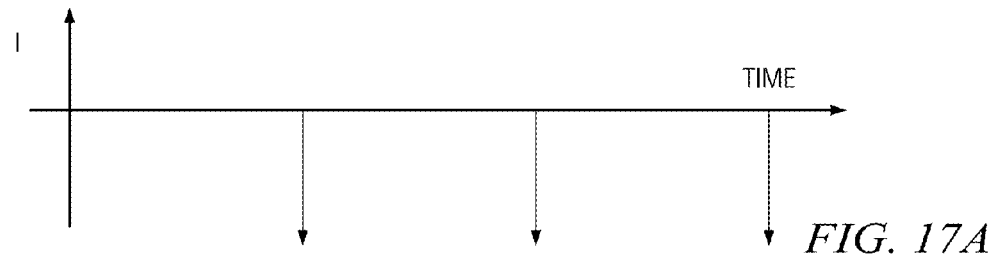
FIGS. 17A, 17B and 17C are plots illustrating current spikes in the time domain for original and gated clocks generated using the gated clock embodiment of the present invention.
Figure 17B:
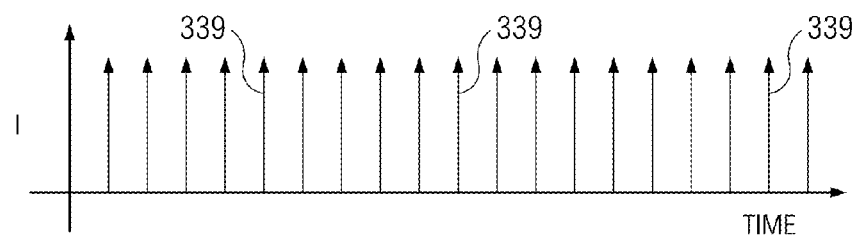
Figure 17C:
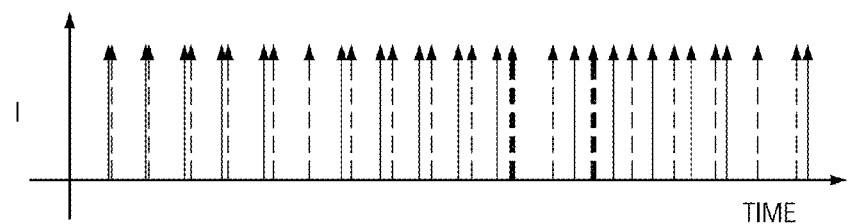

Plots illustrating current spikes in the time domain for original and gated clocks generated using the gated clock embodiment of the present invention are shown in FIGS. 17A, 17B and 17C. In the example presented herein, the fixed PLL 300 frequency is 80 MHz, while the coexistence PLL 304 runs at 81 MHz. The gating circuit is set such that z=1 and therefore every $81^{st}$ clock cycle is gated. The gated pattern will therefore comprise a one microsecond period of 80 cycles with a period of $\frac{1}{81,000,000}$ seconds and a single gated period of the same length.

The current spikes for the original clock (i.e. 80 MHz) are shown by the dashed arrows in FIG. 17C, while the current spikes for the gated clock are shown by the solid arrows. FIG. 17A shows the gating enable signal, shown as negative pulses to indicate negative current consumption, which, if added to the current spikes in FIG. 17B will effectively gate (i.e. zero) a subset of the spikes. In the example presented herein, the gating enable signal is operative to gate one clock cycle every microsecond. FIG. 17B shows the clock output of the coexistence PLL at an 81 MHz rate. When FIGS. 17A and 17B are combined mathematically, the current spikes 339 are canceled and the gated clock pattern of FIG. 17C results.

Figure 18A:
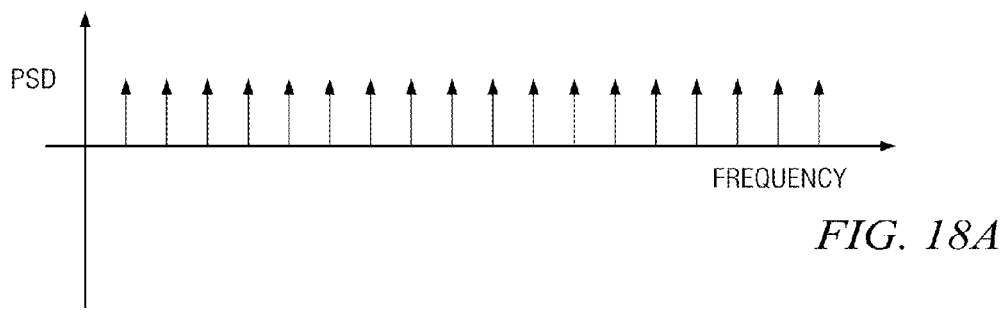
FIGS. 18A, 18B and 18C are plots illustrating spectral density for original and gated clocks generated using the gated clock embodiment of the present invention.
Figure 18B:
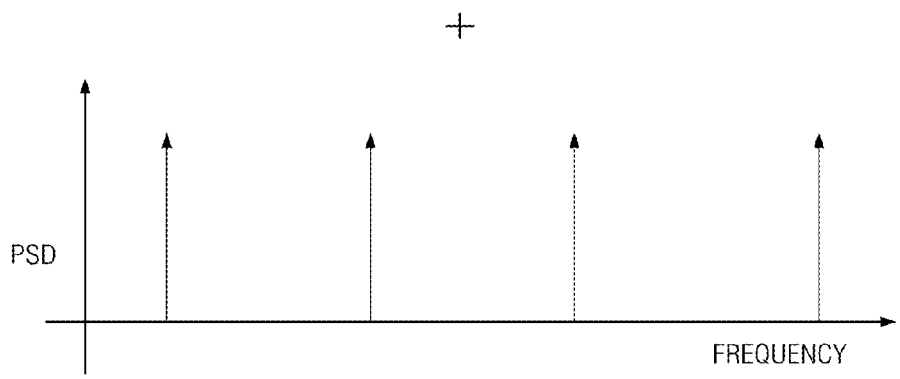
Figure 18C:
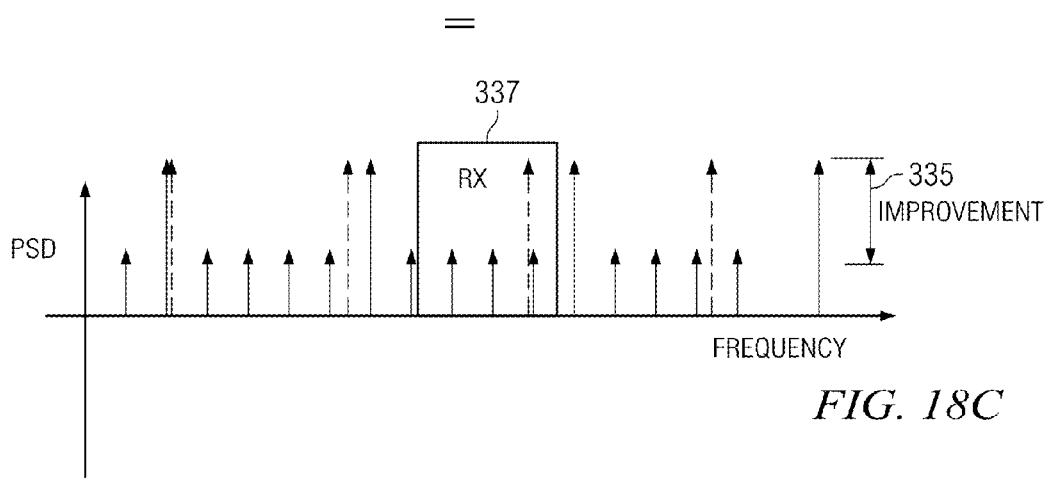

Plots illustrating spectral density for original and gated clocks generated using the gated clock embodiment of the present invention are shown in FIGS. 18A, 18B and 18C. The power spectral density (PSD) of the gating enable signal is shown in FIG. 18A where the spacing between spurs is 1 MHz (i.e. 81-80=1 MHz). FIG. 18B represents the spectrum of the 81 MHz output of the coexistence PLL with spurs spaced apart every 81 MHz. Note that the 1 MHz spacing tones in FIG. 18A are smaller in magnitude than the main harmonics at 81 MHz shown in FIG. 18B.

Combining FIGS. 18A and 18B yields the spectrum shown in FIG. 18C where the dashed spurs represent the original (i.e. 80 MHz) clock signal and the solid spurs represent the gated clock signal. It is important to note that there are now no large spurs within the RX band 337. Note the significant improvement in the total jammer/interferer power into the receiver. The 81 MHz spurs are located outside the RX band while the spurs that are within the RX band have their energy levels significantly reduced compared to the original clock. The spur reduction improvement 335 is shown to the right of FIG. 18C.

Figure 19:
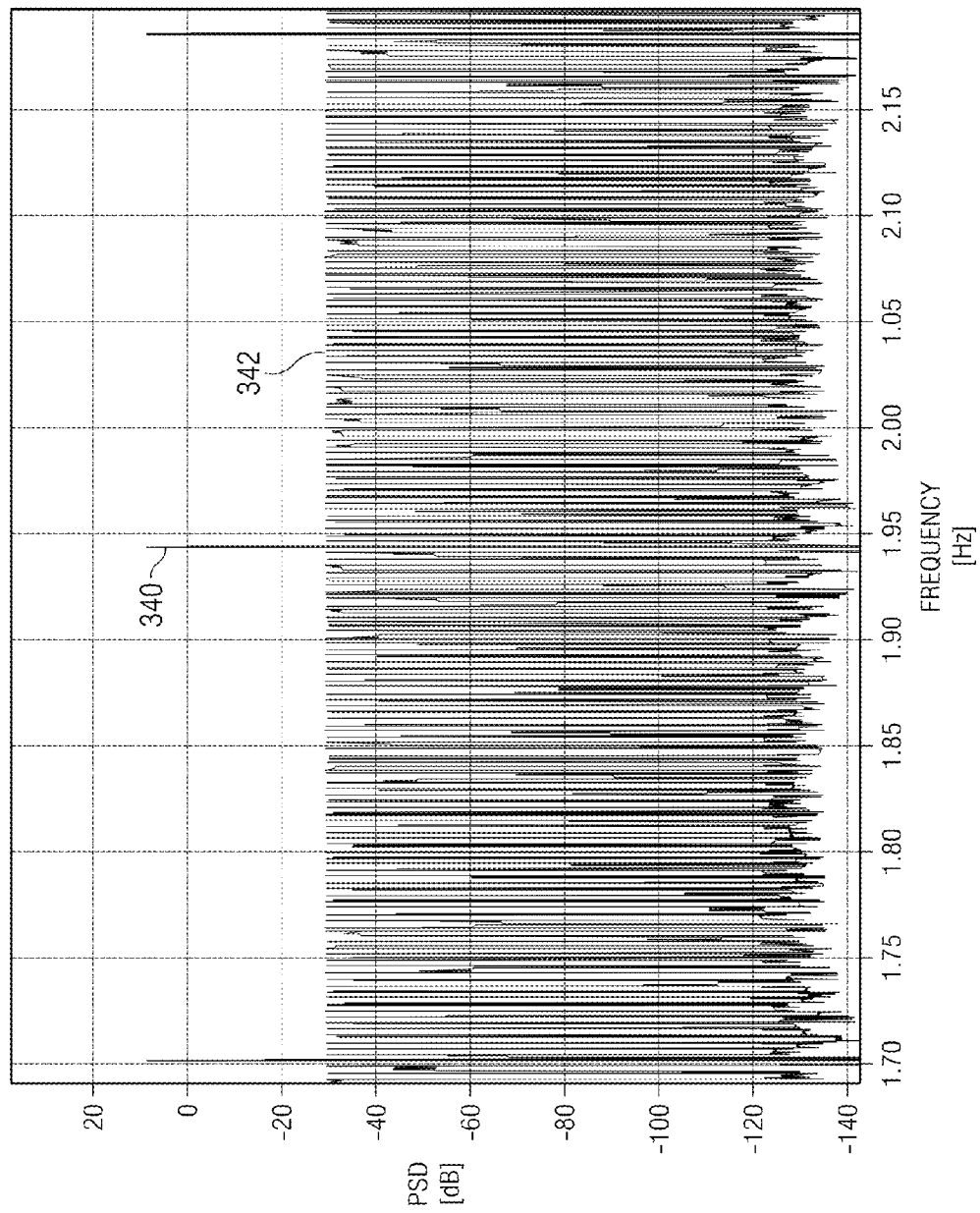
FIG. 19 is a plot illustrating the simulated spectrum for the root clock.

A plot illustrating the simulated spectrum for the gated root clock is shown in FIG. 19. In this example, the fixed PLL frequency is 240 MHz while the coexistence PLL frequency is 243 MHz. Note the high multiples 340 of the coexistence PLL frequency (e.g., 243 MHz) and low spurs 342. The high spurs can be adjusted to avoid a particular receiver band while the small spurs provide an approximate 20-30 dB reduction in de-sense to a victim receiver.

The peak spurs 340 are generated by the 243 MHz clock while the much lower spurs 342 are 3 MHz apart (representing the difference 243-240=3 MHz). Thus, the gated clock is comprised of 243 MHz clock cycles gated so as to have 240 MHz number of transitions. This yields the significant suppression of 240 MHz spurs of approximately 40 dB.

Figure 20:
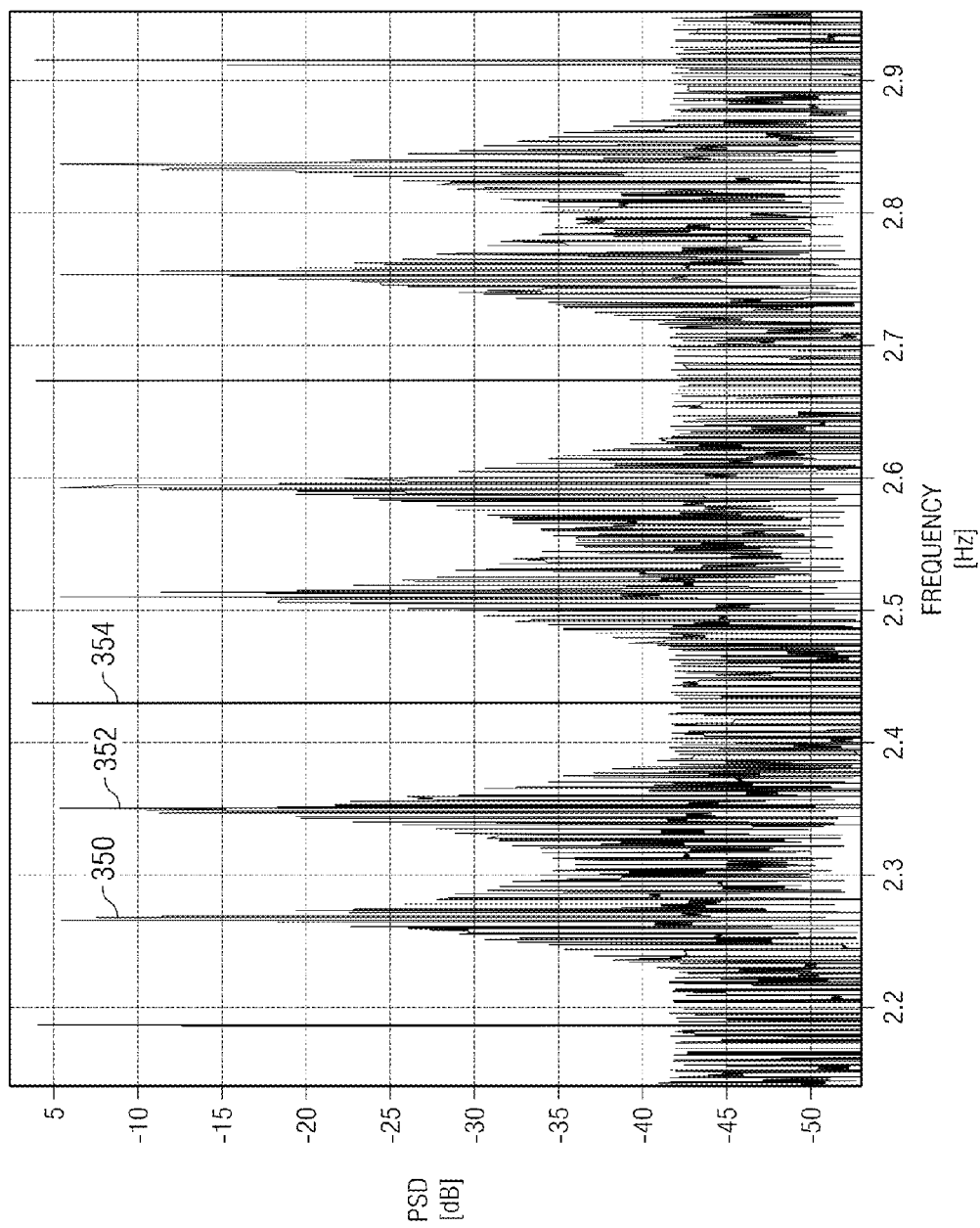
FIG. 20 is a plot illustrating the spectrum at the divided clock.

A plot illustrating the spectrum at the divided clock is shown in FIG. 20. This graph shows the spectrum after the root lock is input to a divide by three clock divider. The spurs 350, 352, 354 occur every 81 MHz (i.e. 243/3 MHz). Spurs 350 and 352 are not as narrow as the spur 354 due to the irregular period of the gated clock.

Figure 21:
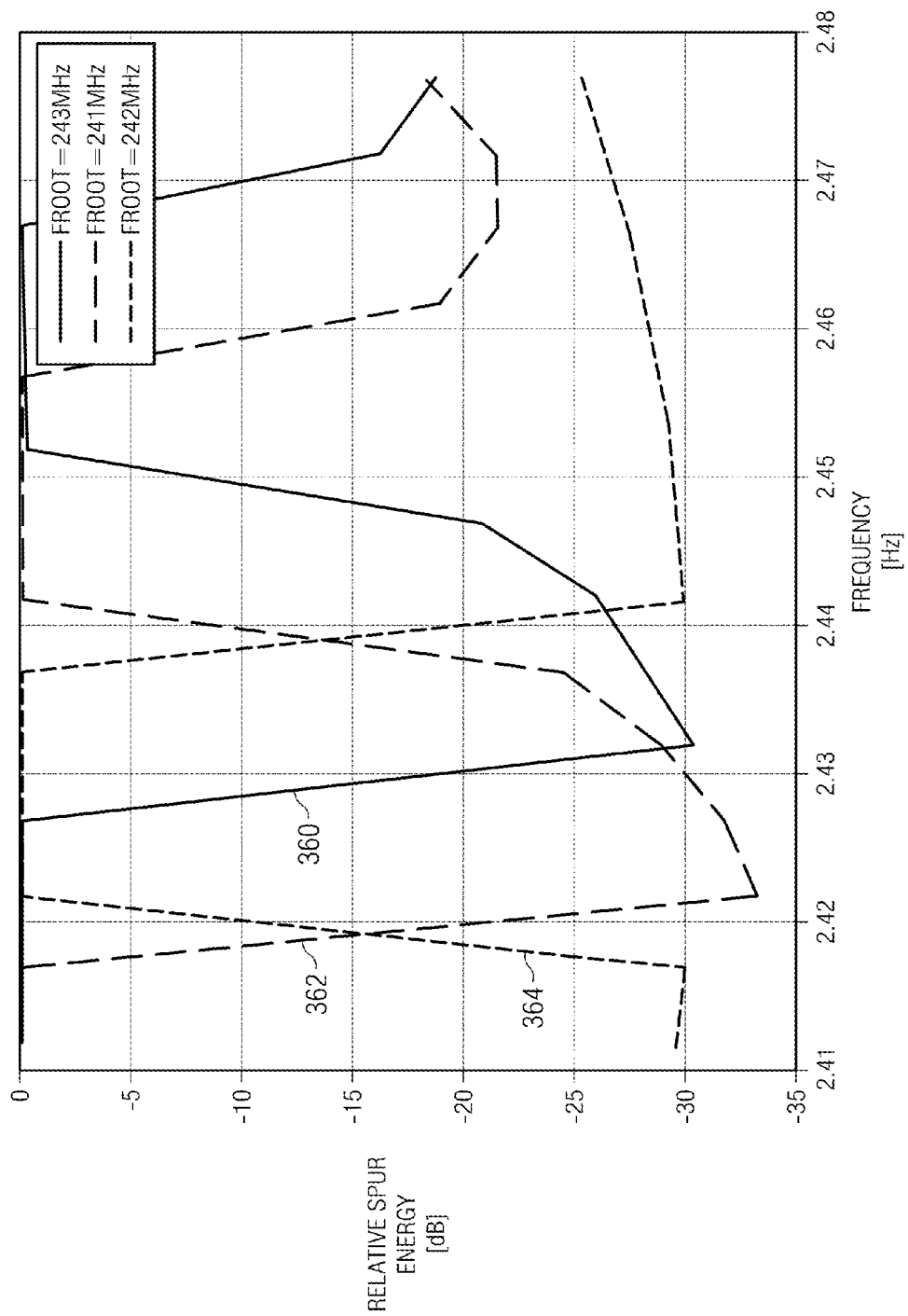
FIG. 21 is a plot illustrating the spur energy versus WLAN channel center frequency.

A plot illustrating the spur energy versus WLAN channel center frequency is shown in FIG. 21. The plots shown were generated by integrating the energy in 802.11g WLAN channels over a 17 MHz period for a 40 MHz clock, thus representing the amount of aggressor energy from the aggressor radio into the victim receiver. The y-axis has been normalized such that the highest aggressor energy is represented by 0 dB. The various traces represent the integrated energy in the victim receiver versus center frequency for three different root frequencies of 241, 242 and 243 MHz. The clocks are compared to a fixed frequency of 240 MHz and gated appropriately. The divider circuits are set to divide the gated clock by six, thus generating a clock with an average frequency of 40 MHz but with instantaneous frequencies of 241/6, 242/6 and 243/6 MHz, respectively.

The graph in FIG. 21 shows that for every root clock frequency, there are major spurs that generate the most severe desensitization at several WLAN center frequencies. The control unit for the aggressor radio, however, is operative, in accordance with the invention, to select a root frequency to partially avoid the interference. It is noted that for every center frequency, if the correct root clock frequency is chosen, a reduction of at least 20 dB versus the worst case (as well as a system without the coexistence mechanism of the invention) is obtained.

A second embodiment is now presented wherein only a single PLL is used thus enabling sampling frequency to vary based on the potential victim bands. To achieve this, the radio uses a constant sampling frequency, usually an integer multiple of the symbol rate an interpolator uses in conjunction with poly-phase interpolation filters. A real time clock (RTC) functions to determine the correct filter phase along with the clock gating required to generate the output clock.

Figure 22:
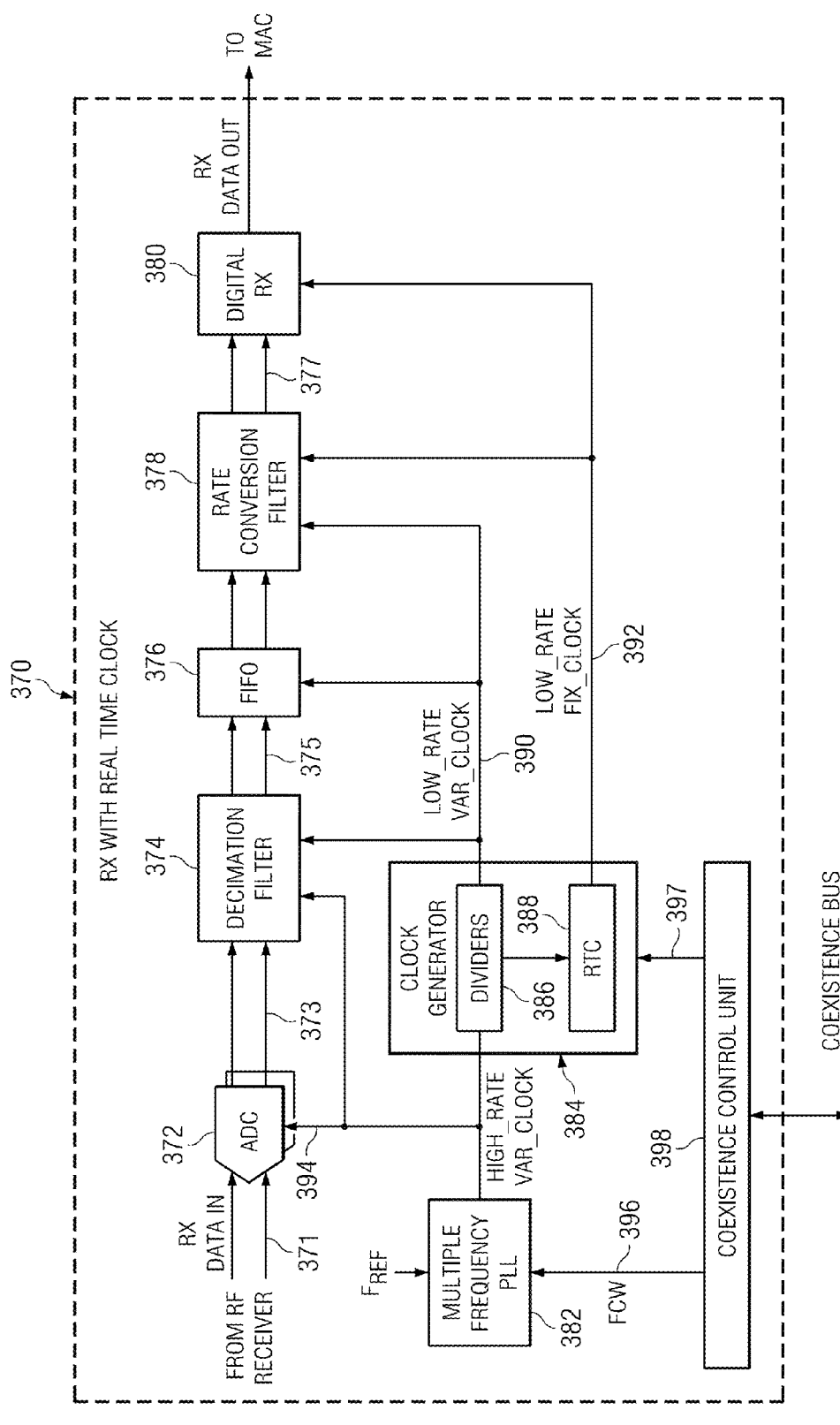
FIG. 22 is a block diagram illustrating an example receiver incorporating the real time clock embodiment of the present invention.

A block diagram illustrating an example receiver incorporating the real time clock embodiment of the present invention is shown in FIG. 22. The receiver circuit, generally referenced 370, comprises ADC 372, decimation filter 374, FIFO 376, rate conversion filter 378, digital TX circuitry 380, multiple frequencies PLL 382, coexistence control unit 398 coupled to coexistence bus 399 and clock generator 384 comprising clock dividers 386 and real time clock (RTC) 388.

In operation, the complex analog IF signal 371 is sampled by the ADC 372. The ADC output (i.e. in-phase and quadrature signals) 373 is then decimated by decimation filter 374 in order to reduce the sampling rate (for power savings purposes). The low rate sampled IF signal 375 is then input to FIFO buffer 376 In order to match the variable and fixed clock rates. Data samples are written into the FIFO buffer at the variable sampling rate 390 and are read out at the fixed sampling rate 392. The data samples are then processed in the Rate Conversion Filter 378 in order to resample them to the fixed sampling rate. This fixed rate complex signal is input to the digital RX circuit block 380.

The clock source for the entire digital RX is a single PLL 382 which operates in a range of frequencies, suitable for the performance requirements of the ADC 372. This PLL frequency is divided by the clock dividers 386 to generate lower rate sampling clocks for the digital processing stages (i.e. decimation filter 374, FIFO 376 and rate conversion filter 378. In addition, the PLL frequency is also divided to a rate suitable to meet the performance requirements for the real time clock (RTC) circuit 388.

The RTC circuit comprises a first order sigma delta which generates a fixed rate clock 392 for the digital RX processing chain 380. The flexibility of the clock scheme requires some level of control to configure the correct parameters of the PLL 382, clock dividers 386 and RTC 388. In order to select the proper operating frequency so as to avoid any interference to potential victim radios, the aggressor should be aware of several parameters of the victim, e.g., operating state, frequency of operation, bandwidth, etc. Knowledge of these parameters is received in victim messages by the aggressor radio over the coexistence bus 399 from other radios. The victim messages are parsed by the coexistence control unit 398. Based on the information received in the victim messages, the aggressor calculates its own operating frequency such that it will not interfere with victim radios. It then configures its PLL and clock generator circuits accordingly.

Figure 23:
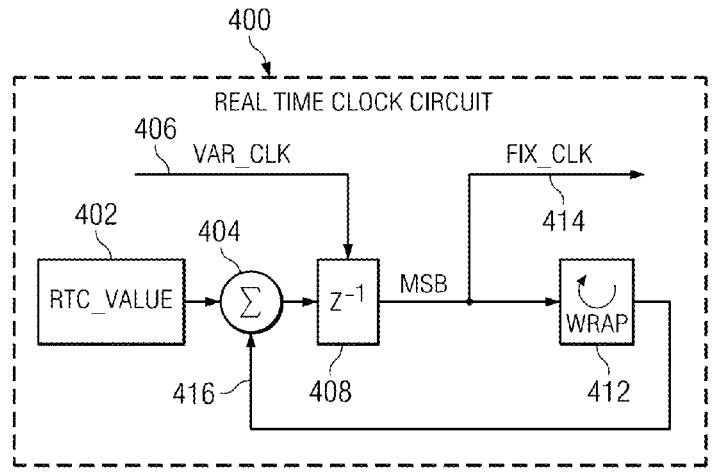
FIG. 23 is a block diagram illustrating the real time clock circuit of FIG. 22 in more detail.

A block diagram illustrating the real time clock circuit of FIG. 22 in more detail is shown in FIG. 23. The real time clock circuit, generally referenced 400, comprises RTC_VALUE register 402, adder 404, delay buffer 408 and wrap circuit block 412. The RTC circuit operates as a first order sigma delta that functions to generate a fixed rate clock in accordance with the configuration it is programmed to. Note that the wrap operation 412 acts as the differentiator in a classic sigma delta structure. The RTC_VALUE 402 is a configurable parameter defined as:

$$\text{RTC\_VALUE} = \frac{\text{fix\_clk}}{\text{var\_clk}} - 1 \quad (1)$$

where var_clk>fix_clk and var_clk is the frequency of the root clock or its division;
fix_clock is the desired average frequency of the resultant clock;

The frequencies can be defined in any unit (e.g., Hz, MHz, etc.) since the actual quotient is unit-less (i.e. expressed in the number of samples).

The RTC is operative to accumulate the value in the buffer 408 on every var_clk 406 cycle. The wrap operation 412 actually takes only the fractional part of the accumulated value and accumulates it with RTC_VALUE, thus keeping the feedback signal 416 smaller than 1. The MSB of the accumulated value, when it exceeds a value of 1, generates the fix_clk.

Figure 25:
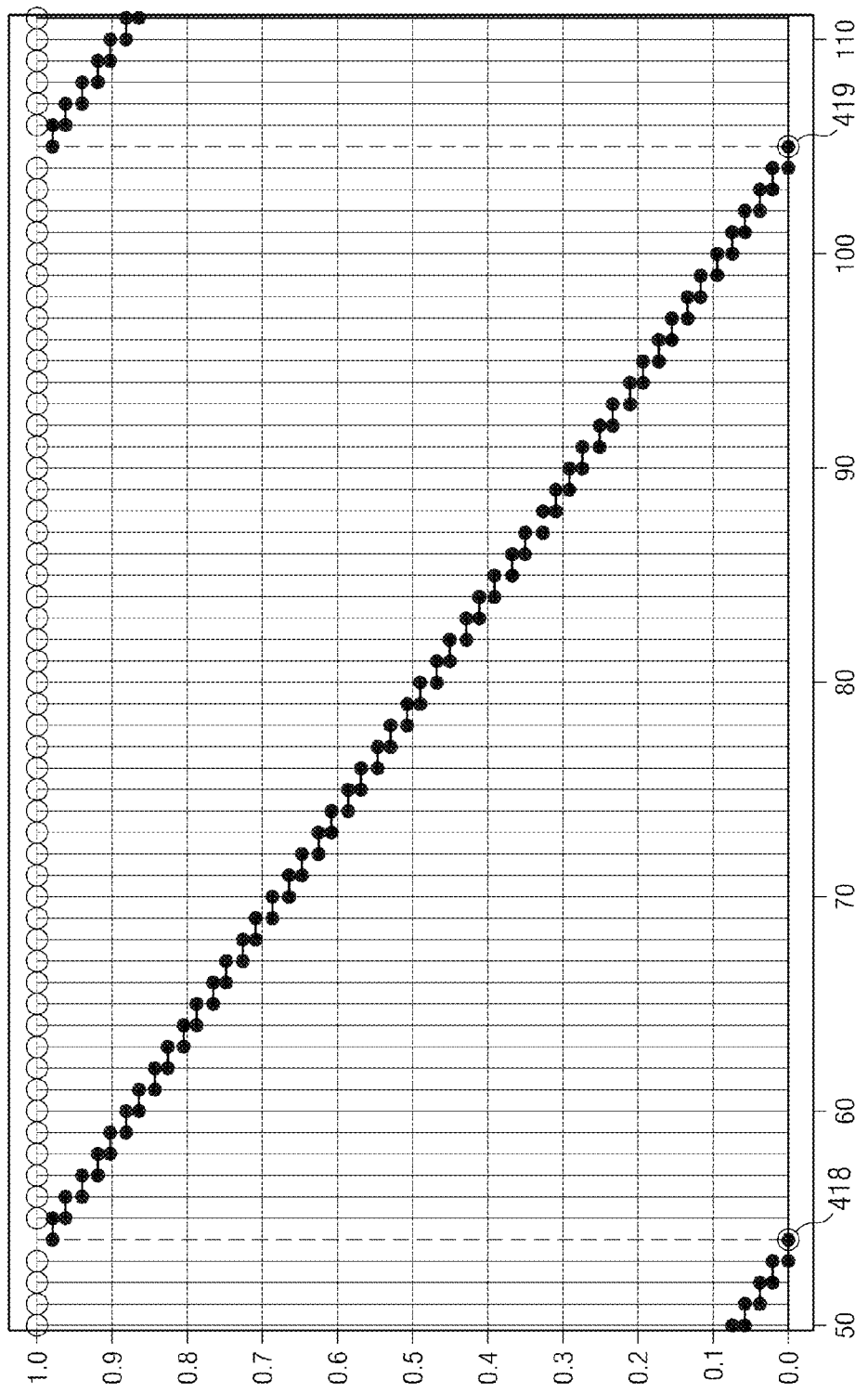
FIG. 25 is a diagram illustrating the operation of the real time clock over time.

The circuit 400 operates as an accumulator of the extra number of samples gained by the faster root clock scheme. Every time this time reaches one sample, the clock is gated. FIG. 25 shows the operation of the RTC over time. The x-axis represents the sample number (in variable clock cycles), the solid plot (open dots) represents the fixed clock and the dashed plot (solid dots) represents the accumulated value in the buffer 408. The marks 418, 419 show the cycles in which the var_clk signal is gated.

Figure 26:
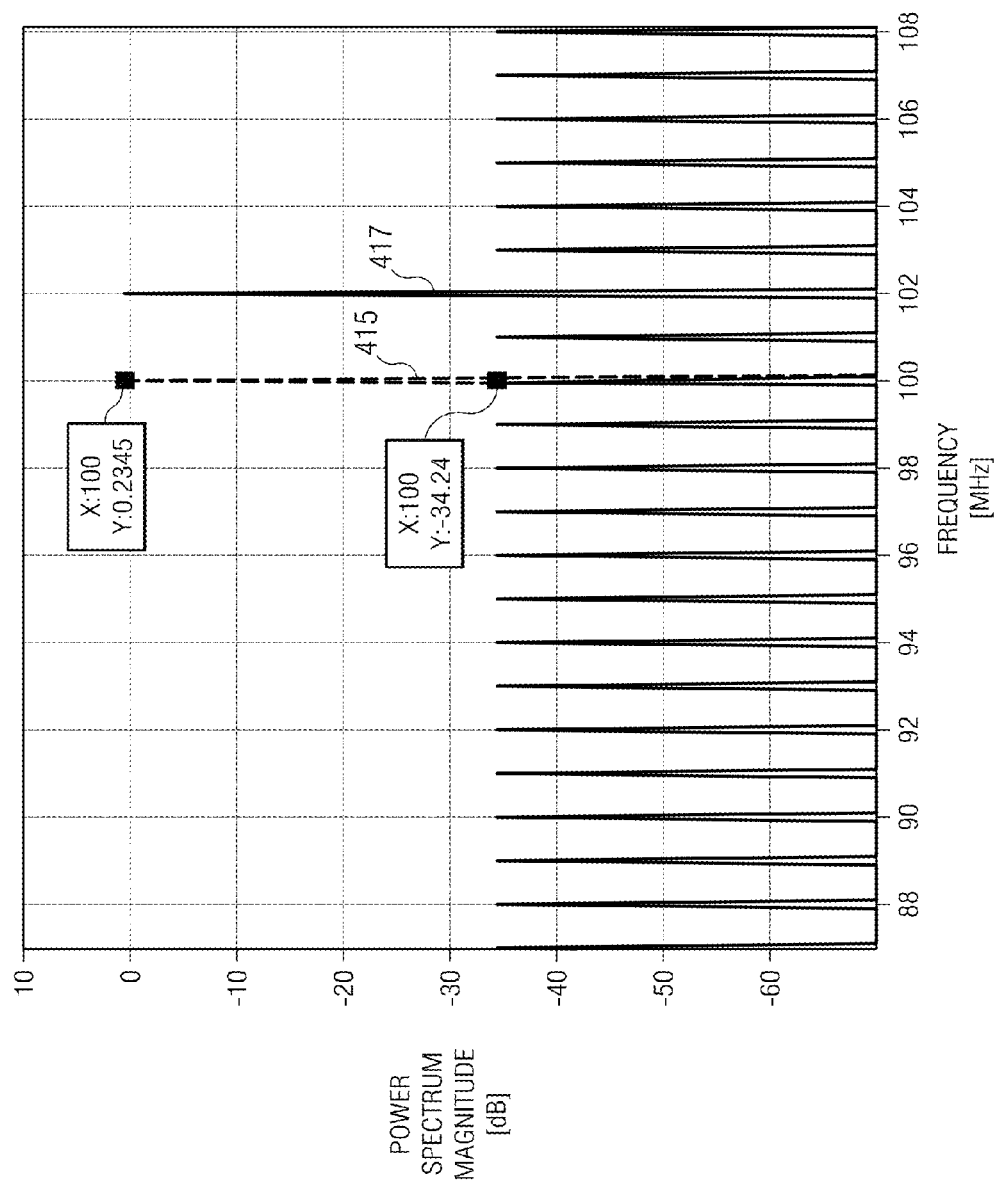
FIG. 26 is a diagram illustrating the performance improvement of the real time clock.

FIG. 26 illustrates the performance improvement of the RTC based clock. The x-axis represents the frequency in MHz and the y-axis represents the power spectrum magnitude in dB. The dashed trace 415 is the second harmonic of a regular 50 MHz clock. The solid trace 417 is the second harmonic of the RTC generated 50 MHz clock which is generated from a 51 MHz clock (as the var_clk). As indicated in the graph, the interference of the RTC generated clock at 50 MHz is attenuated by approximately 35 dB compared to the pure 50 MHz clock.

Figure 24:
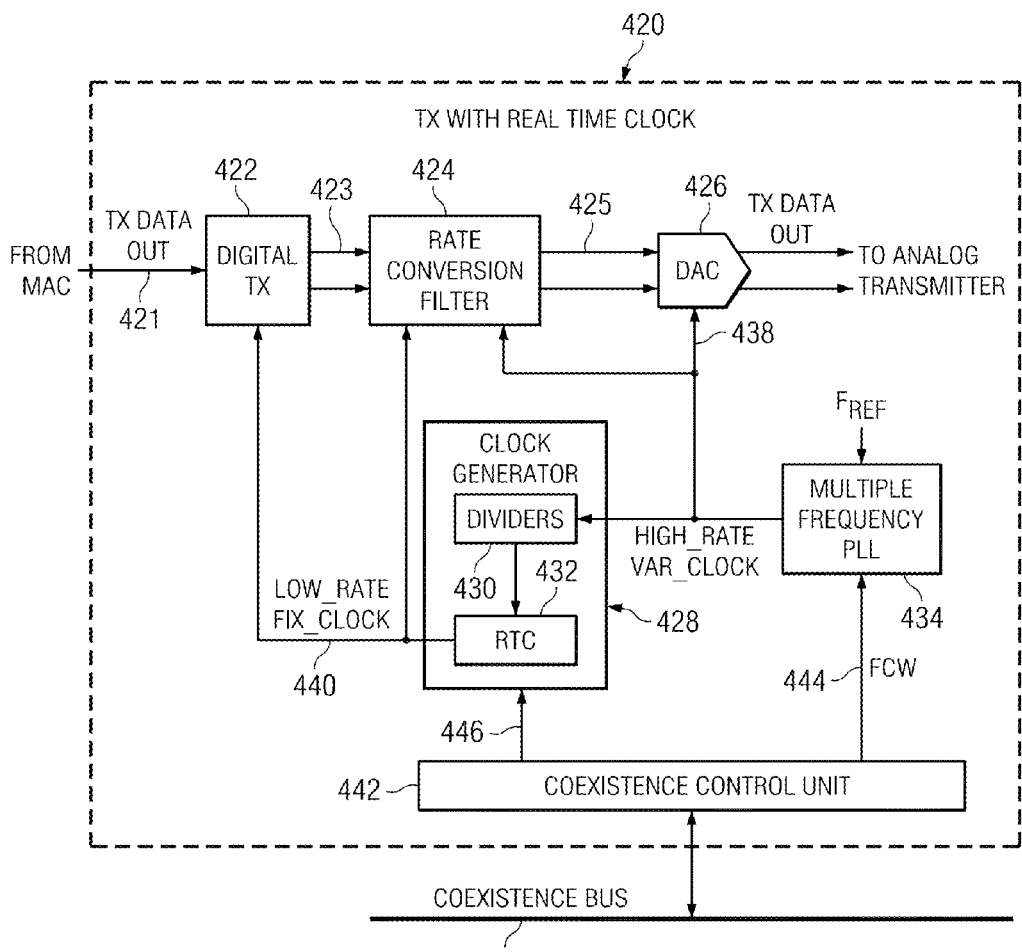
FIG. 24 is a block diagram illustrating an example transmitter incorporating the real time clock embodiment of the present invention.

A block diagram illustrating an example transmitter incorporating the real time clock embodiment of the present invention is shown in FIG. 24. The transmitter circuit, generally referenced 420, comprises a digital TX (DTX) 422, rate conversion filter 424, DAC 426, multiple frequency PLL 434, coexistence control unit coupled to coexistence bus 436 and clock generate block 428 comprising clock dividers 430 and RTC circuit 432.

The circuit 420 is an example of the transmit chain on the aggressor side constructed in accordance with the coexistence mechanism. The information bits 421 (TX DATA IN) from the MAC (not shown) are input to the digital TX block 422, where they are processed and converted to a complex baseband or IF signal 423. This signal is then re-sampled by the rate conversion filter 424 to a variable clock rate signal 425 and input to the digital to analog converter (DAC) 426. The output of the DAC is input to the analog transmitter.

The clock scheme in the TX chain is similar to that in the RX chain (FIG. 22) and comprises a single PLL 434 which operates in a range of frequencies, suitable to meet the performance requirements of the DAC 426. The PLL frequency is divided by the clock dividers 430 to create a rate suitable to meet the performance requirements of the RTC 432. The RTC circuit comprises a first order sigma delta which generates a fixed rate clock 440 for the digital TX processing chain 422. The flexibility of the clock scheme requires some level of control to configure the correct parameters of the PLL 434, clock dividers 430 and RTC circuit 432. In order to select the proper operating frequency so as to avoid any interference to the potential victims, the aggressor should be aware of several parameters of the victim, e.g., operating state, frequency of operation, bandwidth, etc. Upon receiving knowledge of these parameters (via victim messages received over the coexistence bus 436, the aggressor calculates its own operating frequency such that it will not interfere with any victim radio. It then configures the PLL 434 and clock generator 428.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of distributed coexistence between a plurality of aggressor and victim radios, said method comprising the steps of:
   each victim radio communicating receiver (RX) information to all other radios; and
   each aggressor radio configuring its root clock frequency based on received RX information so as to avoid interfering with said victim radios, wherein said RX information is conveyed in victim messages comprising a victim stop message indicating that a victim radio has stopped receiving and is no longer a potential victim.

2. The method according to claim 1, wherein said RX information is communicated between victim and aggressor radios over a common coexistence bus connected thereto.

3. The method according to claim 1, wherein said RX information is conveyed in victim messages and comprises information selected from the group consisting of reception band, center frequency and bandwidth.

4. The method according to claim 1, wherein said step of configuring comprises the steps of:
   comparing whether a root clock frequency, its derivatives and harmonics potentially interferes with a victim radio; and
   if so, selecting a new root clock frequency that does not interfere with said victim radios.

5. The method according to claim 1, wherein said aggressor and victim radios are chosen from the group consisting of: Global System for Mobile communications (GSM), General Packet Radio Service (GPRS), General Packet Radio Service (EDGE), Global Positioning System (GPS), Wireless Local Area Network (WLAN), Bluetooth and Near Field communications (NFC).

6. A method of distributed coexistence between a plurality of aggressor and victim radios, said method comprising the steps of:
   receiving receiver (RX) information at an aggressor radio from one or more victim radios, wherein said RX information comprises a victim stop message indicating that a victim radio has stopped receiving and is no longer a potential victim;
   comparing a root clock frequency of said aggressor radio to RX information received from said one or more victim radios; and
   if said root clock frequency interferes with a victim radio then configuring said aggressor radio with a new root clock frequency that does not interference with said one or more victim radios.

7. The method according to claim 6, wherein said RX information is communicated between victim and aggressor radios over a common coexistence bus connected thereto.

8. The method according to claim 6, wherein said RX information is conveyed in victim messages and comprises information selected from the group consisting of reception band, center frequency and bandwidth.

9. The method according to claim 6, wherein said aggressor radio interferes with a victim radio if its current root clock frequency, its derivatives or harmonics lie within a current victim frequency band.

10. The method according to claim 6, wherein said aggressor and victim radios are chosen from the group consisting of: Global System for Mobile communications (GSM), General Packet Radio Service (GPRS), General Packet Radio Service (EDGE), Global Positioning System (GPS), Wireless Local Area Network (WLAN), Bluetooth and Near Field communications (NFC).

11. A distributed coexistence apparatus incorporating aggressor and victim radios, comprising:
   a notification unit in each victim radio operative to generate victim messages incorporating receive (RX) information, wherein said victim messages comprise a victim stop message indicating that a victim radio has stopped receiving and is no longer a potential victim;
   a coexistence bus coupled to said aggressor and victim radios, said coexistence bus operative to communicate victim messages from victim radios to aggressor radios; and
   a coexistence control unit associated with each aggressor radio, each coexistence control unit operative to configure a root clock frequency selected so as not to interfere with the frequency band of victim radios.

12. The apparatus according to claim 11, wherein said RX information comprises information related to current and/or future RX frequency bands.

13. The apparatus according to claim 11, wherein said coexistence control unit is operative to select from among a plurality of root frequencies selected a priori in the event interference with a victim radio is detected.

14. The apparatus according to claim 11, wherein said coexistence control unit is operative to select said root clock frequency utilizing a formula in the event interference with a victim radio is detected.

15. The apparatus according to claim 11, wherein said aggressor and victim radios are chosen from the group consisting of: Global System for Mobile communications (GSM), General Packet Radio Service (GPRS), General Packet Radio Service (EDGE), Global Positioning System (GPS), Wireless Local Area Network (WLAN), Bluetooth and Near Field communications (NFC).

16. An apparatus for distributed coexistence between a plurality of radios including aggressor and victim radios, comprising:
   a coexistence bus coupled to said plurality of radios, said coexistence bus operative to provide communications between said plurality of radios;

a coexistence control unit associated with each radio, each coexistence control unit operative to:
- transmit victim messages incorporating receive (RX) information to other radios over said coexistence bus, wherein said victim messages comprise a victim stop message indicating that a victim radio has stopped receiving and is no longer a potential victim;
- receive victim messages incorporating receive (RX) information from other radios over said coexistence bus;
- first determine the frequency spurs and harmonics potentially generated from a current root clock frequency;
- second determine whether said frequency spurs and harmonics potentially interfere with the frequency band of other radios; and
- if potential interference is detected, select a new root clock frequency so as to avoid interference with other radios.

17. The apparatus according to claim 16, wherein said RX information comprises information related to current and/or future RX frequency bands.

18. The apparatus according to claim 16, wherein said coexistence control unit is operative to select from among a plurality of root frequencies selected a priori in the event interference with a radio is detected.

19. The apparatus according to claim 16, wherein said coexistence control unit is operative to select a new root clock frequency utilizing a formula in the event interference with a radio is detected.

20. The apparatus according to claim 16, wherein said RX information is conveyed in victim messages and comprises information selected from the group consisting of reception band, center frequency and bandwidth.

21. The apparatus according to claim 16, wherein said plurality of radios are chosen from the group consisting of: Global System for Mobile communications (GSM), General Packet Radio Service (GPRS), General Packet Radio Service (EDGE), Global Positioning System (GPS), Wireless Local Area Network (WLAN), Bluetooth and Near Field communications (NFC).

22. A multi-radio device, comprising:
- a plurality of co-located radios;
- a plurality of coexistence control units, each coexistence control unit associated with a respective radio;
- a coexistence bus coupled to said plurality of radios, said coexistence bus operative to provide communications between said plurality of coexistence control units;
- each coexistence unit operative to:
  - transmit victim messages incorporating receive (RX) information to other radios over said coexistence bus, wherein said victim messages comprise a victim stop message indicating that a radio has stopped receiving and is no longer a potential victim;
  - receive victim messages incorporating receive (RX) information from other radios over said coexistence bus;
  - first determine the frequency spurs and harmonics potentially generated from a current root clock frequency;
  - second determine whether said frequency spurs and harmonics potentially interfere with the frequency band of other radios; and
  - if potential interference is detected, select a new root clock frequency so as to avoid interference with other radios.

23. The multi-radio device according to claim 22, wherein said RX information comprises information related to current and/or future RX frequency bands.

24. The multi-radio device according to claim 22, wherein said coexistence control unit is operative to select from among a plurality of root frequencies selected a priori in the event interference with a radio is detected.

25. The multi-radio device according to claim 22, wherein said coexistence control unit is operative to select a new root clock frequency utilizing a formula in the event interference with a radio is detected.

26. The multi-radio device according to claim 22, wherein said RX information is conveyed in victim messages and comprises information selected from the group consisting of reception band, center frequency and bandwidth.

27. The multi-radio device according to claim 22, wherein said plurality of radios are chosen from the group consisting of: Global System for Mobile communications (GSM), General Packet Radio Service (GPRS), General Packet Radio Service (EDGE), Global Positioning System (GPS), Wireless Local Area Network (WLAN), Bluetooth and Near Field communications (NFC).

* * * * *